United States Patent
Sundar et al.

(10) Patent No.: US 11,609,932 B2
(45) Date of Patent: Mar. 21, 2023

(54) WEB SERVICES HAVING LIVE DATA UPDATES

(71) Applicant: ADP, Inc., Roseland, NJ (US)

(72) Inventors: Aravind Sundar, Bristol (GB); Daniel Derham, Bristol (GB); Jordan Beard, Bristol (GB); Bradley Young, Bristol (GB)

(73) Assignee: ADP, INC., Roseland, NJ (US)

( * ) Notice: Subject to any disclaimer, the term of this patent is extended or adjusted under 35 U.S.C. 154(b) by 188 days.

(21) Appl. No.: 16/832,931

(22) Filed: Mar. 27, 2020

(65) Prior Publication Data

US 2021/0303595 A1 Sep. 30, 2021

(51) Int. Cl.
| | |
|---|---|
| H04L 67/141 | (2022.01) |
| G06F 16/958 | (2019.01) |
| H04L 67/01 | (2022.01) |
| G06F 16/27 | (2019.01) |
| H04L 67/00 | (2022.01) |
| G06F 16/23 | (2019.01) |

(52) U.S. Cl.
CPC ........ *G06F 16/273* (2019.01); *G06F 16/2358* (2019.01); *G06F 16/2379* (2019.01); *G06F 16/958* (2019.01); *H04L 67/01* (2022.05); *H04L 67/141* (2013.01); *H04L 67/34* (2013.01)

(58) Field of Classification Search
CPC .. G06F 16/273; G06F 16/2379; G06F 16/958; G06F 16/2358; H04L 67/141; H04L 67/34; H04L 67/42
USPC ........................................................ 707/613
See application file for complete search history.

(56) References Cited

U.S. PATENT DOCUMENTS

| | | | |
|---|---|---|---|
| 7,627,658 B2 | 12/2009 | Levett et al. | |
| 7,975,019 B1 | 7/2011 | Green et al. | |
| 8,612,406 B1 | 12/2013 | Said et al. | |
| 9,218,435 B2 | 12/2015 | Buttner et al. | |
| 9,959,192 B1 * | 5/2018 | Burriesci | G06F 11/3664 |
| 10,853,062 B1 * | 12/2020 | Holt | G06F 8/38 |
| 2004/0148375 A1 * | 7/2004 | Levett | G06F 9/46 |
| | | | 707/999.001 |
| 2006/0184613 A1 | 8/2006 | Stienessen et al. | |

(Continued)

OTHER PUBLICATIONS

Johnson et al. An Electronic Health Record Based on Structured Narrative, 2008, DOI 10.1197/jamia.M2131, all pages. (Year: 2008).*

*Primary Examiner* — James Trujillo
*Assistant Examiner* — Antonio J Caiado
(74) *Attorney, Agent, or Firm* — Foley & Lardner LLP

(57) ABSTRACT

A method, apparatus, and computer program product for communicating real-time updates among web clients. A structured data object is composed from a set of data nodes according to a domain specific language in response to requesting access to a data within a human resources database. The structured data object is interpreted within a context of a record ID/form to identify content for the web page and to determine whether real-time updates are enabled for the web page. Interpreting the structured data object, displays the form with the content. An event queue is created and a connection to the server hub is established when real-time updates are enabled. In response to receiving an update event in the event queue, a notification of the update event is displayed when the update event matches the record ID/form that a first user has opened.

18 Claims, 22 Drawing Sheets

(56) References Cited

U.S. PATENT DOCUMENTS

| | | | |
|---|---|---|---|
| 2010/0175044 A1* | 7/2010 | Doddavula | G06F 8/38 717/104 |
| 2011/0271176 A1* | 11/2011 | Menday | G06F 16/367 715/234 |
| 2013/0104030 A1* | 4/2013 | Parreira | H04L 67/02 715/234 |
| 2013/0204610 A1* | 8/2013 | Wu | G06F 40/58 704/9 |
| 2015/0172228 A1* | 6/2015 | Zalepa | H04L 12/1813 709/206 |
| 2015/0269130 A1 | 9/2015 | Huber et al. | |
| 2017/0032050 A1* | 2/2017 | Kol | G06F 16/986 |
| 2019/0004792 A1* | 1/2019 | Brebner | G06F 8/41 |
| 2021/0004209 A1* | 1/2021 | Holt | G06F 8/41 |
| 2021/0117299 A1* | 4/2021 | Yara | G06F 11/0772 |
| 2021/0263779 A1* | 8/2021 | Haghighat | G06F 9/5061 |
| 2021/0297318 A1* | 9/2021 | Chatterjee | H04L 41/5009 |

* cited by examiner

FIG. 18

Client Trainer

Uploads

Candidate details

Please verify the candidate details and add any missing information

First name *
Andrew

Last name *
Smith

Email *
andrew.smith@xyz.com

Mobile number *
55555557895

Source *
Agency

SUBMIT  CANCEL

Add candidate

Client Trainer

Uploads

Upload the candidate's CV / resume first and the candidate's basic details will be extracted for you to verify Upload CV *
Upload either doc, docx, pdf, txt, rtf (max 5MB)

ANDREW SMITH.DOCX  ⊗ REMOVE

Supporting documents
Upload either doc, docx, pdf, txt, rtf (max 5MB)

SUPPORTING DOCUMENTS

Candidate details

NEXT  SUBMIT  CANCEL

Edit candidate

ⓘ Joey Harrison has started editing this document

First name *
Andrew

Last name *
Smith

Source *
Agency

Contact details
Email address *
andrew.smith@xyz.com

Mobile telephone *
55555557895

Contact number

Address details
Country *
United Kingdom

Address line 1
Rustic Place, Harper Road

Address line 2

FIG. 27

WEB SERVICES HAVING LIVE DATA UPDATES

BACKGROUND INFORMATION

1. Field

The present disclosure relates generally to an improved computer system and, in particular, to a method and apparatus for accessing information in a computer system. Still more particularly, the present disclosure relates to a method, a system, and a computer program product for communicating real-time updates among web clients.

2. Background

Applications are commonly run with a connection to the Internet. The applications may be used for different functions such as e-mail, instant messaging, online retail sales, online auctions, payroll, benefits administration, financial transactions, report generation, and many other functions. These applications include, for example, web applications that run in browsers.

A web application is a server/client application in which the client runs on a web browser. Web applications are popular because of the widespread use of web browsers. The web browsers provide access to a server on the World Wide Web, which is also referred to just as the Web.

The web application can be used to perform a variety of activities. For example, users employ the Internet to read articles, watch news reports, listen to music, send messages, perform research, play online games, perform banking transactions, purchase products and services, pay bills, talk to other people using voice communications, and perform other activities over the Internet.

With the vast number of users that can access different web applications, maintaining and providing access to accurate and up-to-date data records may be harder than desired. For example, when data records are edited by a first user, that information may not be easily accessible to a second user that is concurrently accessing the data records.

Therefore, it would be desirable to have a method and apparatus that take into account at least some of the issues discussed above, as well as other possible issues. For example, it would be desirable to have a method and apparatus that overcome a technical problem with viewing up-to-date data records that are simultaneously accessed by multiple users in a Web services environment.

SUMMARY

An embodiment of the present disclosure provides a method for communicating real-time updates among web clients. In response to requesting access to a data within a human resources database, a computer system receives a structured data object composed from a set of data nodes according to a domain specific language. The structured data object defines what a web page looks like without content for the web page. The computer system interprets the structured data object within a record ID context to identify content for the web page. In response to interpreting the structured data object, the computer system displays the form with the content. The computer system interprets the structured data object to determine whether real-time updates are enabled for the web page. In response to determining that real-time updates are enabled for the web page, the computer system creates an event queue and establishes a web socket connection to the server hub. In response to receiving an update event in the event queue, the computer system, determines whether the update event matches the record ID/form that the user has opened. In response to determining that the update event matches the record ID/form, the computer system displays a notification of the update event.

Yet another embodiment of the present disclosure provides a computer system. The computer system comprises a hardware processor. In response to requesting access to a data within a human resources database, a computer system receives a structured data object composed from a set of data nodes according to a domain specific language. The structured data object defines what a web page looks like without content for the web page. The computer system interprets the structured data object within a record ID context to identify content for the web page. In response to interpreting the structured data object, the computer system displays the form with the content. The computer system interprets the structured data object to determine whether real-time updates are enabled for the web page. In response to determining that real-time updates are enabled for the web page, the computer system creates an event queue and establishes a web socket connection to the server hub. In response to receiving an update event in the event queue, the computer system, determines whether the update event matches the record ID/form that the user has opened. In response to determining that the update event matches the record ID/form, the computer system displays a notification of the update event.

Yet another embodiment of the present disclosure provides a computer program product for communicating real-time updates among web clients. The computer program product comprises a non-transitory computer readable storage media and program code, stored on the computer readable storage media. The program code includes code for receiving a structured data object composed from a set of data nodes according to a domain specific language, in response to requesting access to a data within a human resources database. The structured data object defines what a web page looks like without content for the web page. The program code includes code for interpreting the structured data object within a record ID context to identify content for the web page. The program code includes code for displaying the form with the content, response to interpreting the structured data object. The program code includes code for interpreting the structured data object to determine whether real-time updates are enabled for the web page. The program code includes code for creating an event queue and establishing a web socket connection to the server hub, in response to determining that real-time updates are enabled for the web page. The program code includes code for determining whether the update event matches the record ID/form that the user has opened, in response to receiving an update event in the event queue. The program code includes code for displaying a notification of the update event, in response to determining that the update event matches the record ID/form.

The features and functions can be achieved independently in various embodiments of the present disclosure, or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 16 is a first screen of a first graphical user interface of a first client device showing a second example of propagating real-time updates between client devices in accordance with an illustrative embodiment;

FIG. 17 is a first screen of a second graphical user interface of a second client device showing the second example of propagating real-time updates between client devices in accordance with an illustrative embodiment;

FIG. 18 is a second screen of the first graphical user interface of the first client device showing the second example of propagating real-time updates between client devices in accordance with an illustrative embodiment;

FIG. 20 is a first screen of a first graphical user interface of a first client device showing a third example of propagating real-time updates between client devices in accordance with an illustrative embodiment;

FIG. 22 is a second screen of the first graphical user interface of the first client device showing the third example of propagating real-time updates between client devices in accordance with an illustrative embodiment;

FIG. 25 is a first screen of a second graphical user interface of a second client device showing the fourth example of propagating real-time updates between client devices in accordance with an illustrative embodiment;

FIG. 27 is a second screen of the second graphical user interface of the second client device showing the fourth example of propagating real-time updates between client devices in accordance with an illustrative embodiment.

DETAILED DESCRIPTION

The illustrative embodiments provide a method, an apparatus, and a computer program product for communicating real-time updates among web clients. In one illustrative example, in response to requesting access to a data within a human resources database, a computer system receives a structured data object composed from a set of data nodes according to a domain specific language. The structured data object defines what a web page looks like without content for the web page. The computer system interprets the structured data object within a record ID context to identify content for the web page. In response to interpreting the structured data object, the computer system displays the form with the content. The computer system interprets the structured data object to determine whether real-time updates are enabled for the web page. In response to determining that real-time updates are enabled for the web page, the computer system creates an event queue and establishes a web socket connection to the server hub. In response to receiving an update event in the event queue, the computer system, determines whether the update event matches the record ID/form that the user has opened. In response to determining that the update event matches the record ID/form, the computer system displays a notification of the update event.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

Figure 1:
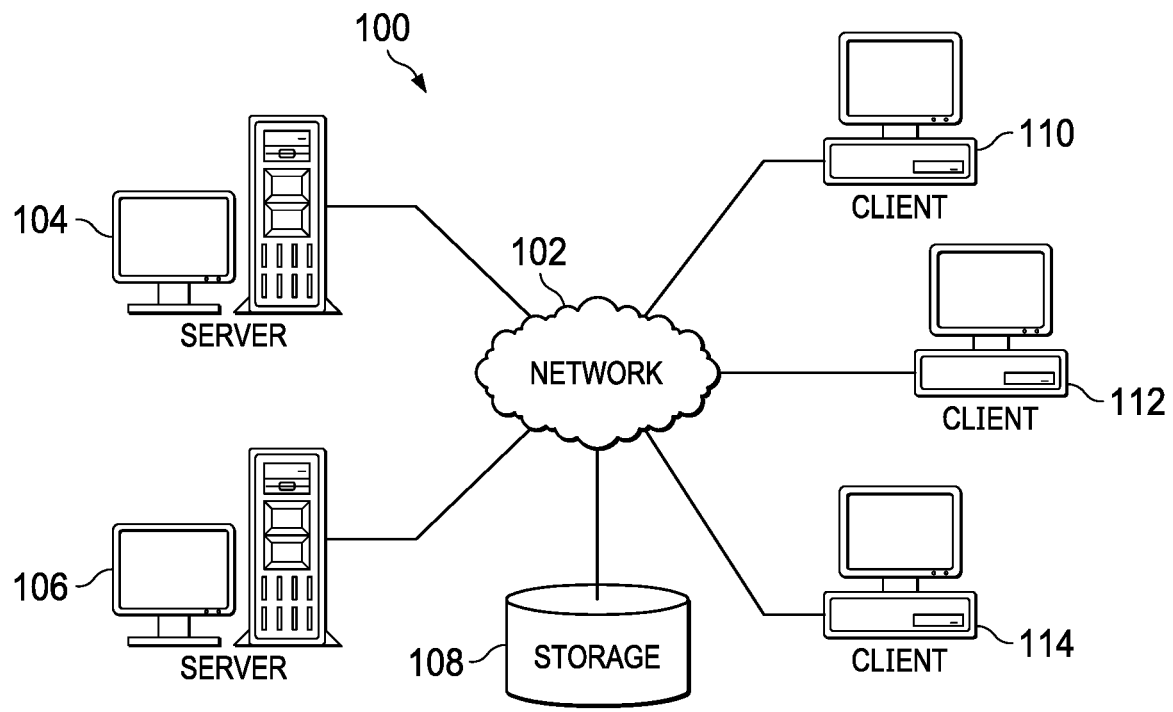
FIG. 1 is a diagram of a data processing environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation, with regard to the environments in which the different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

Figure 2:
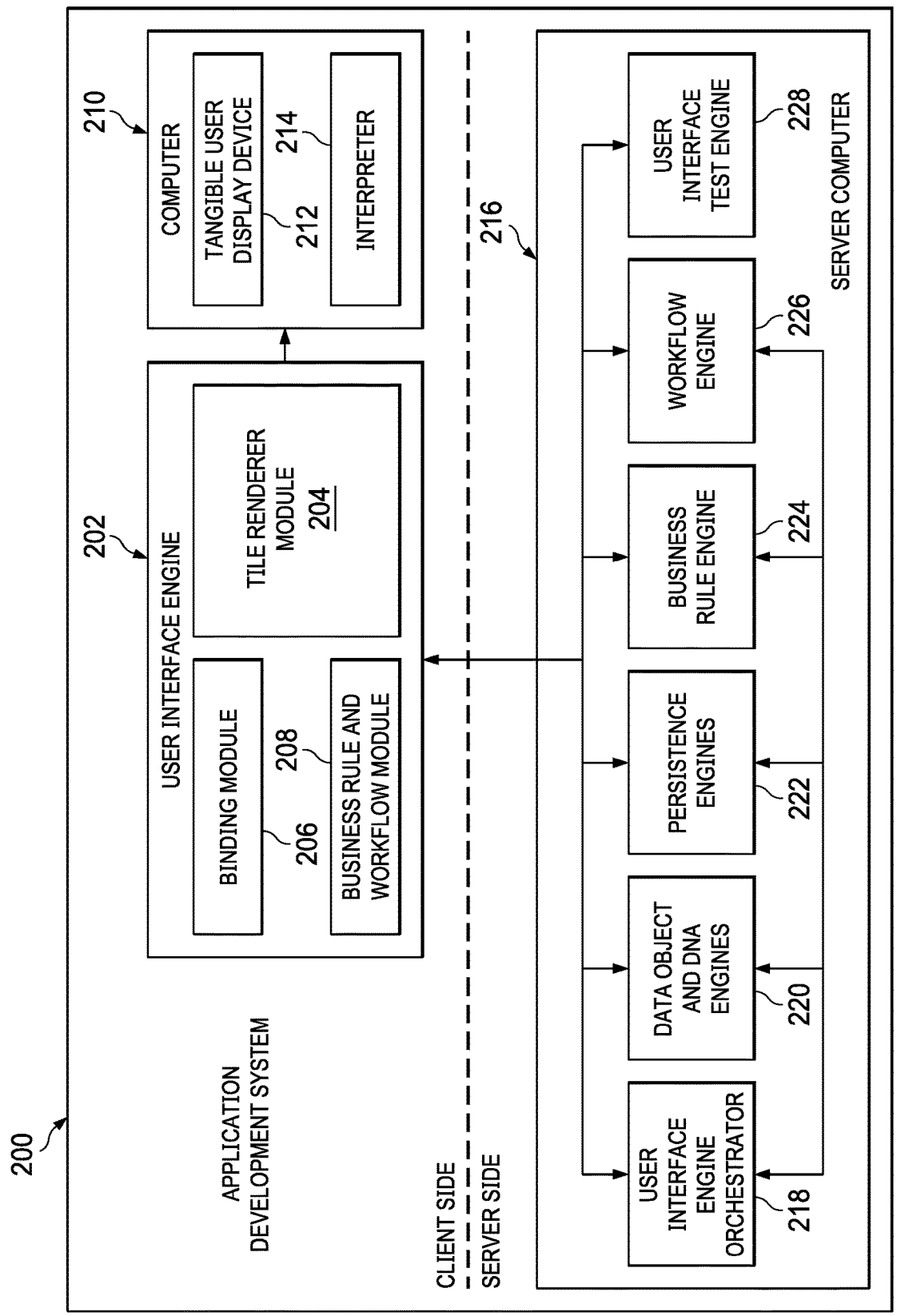
FIG. 2 is a block diagram of an application development system for a domain-specific language entirely composed of structured data objects in accordance with an illustrative embodiment.

FIG. 2 is a block diagram illustrating an application development system for a domain-specific language entirely composed of structured data objects, in accordance with an illustrative embodiment. Application development system 200 may be used to manipulate composable data nodes to build at least one of business rules, miniapps, and apps. Application development system 200 can be implemented in one or more of server computer 104, server computer 106, client computer 110, client computer 112, and client computer 114 of FIG. 1.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

User interface engine 202 is computer code and underlying data and structured data object which provide underlying functionality and implementation capability for application designers. Primarily, user interface engine 202 operates client-side, meaning that user interface engine 202 operates on a specific client user's computer, such as one or more of client computer 110, client computer 112, and client computer 114 of FIG. 1. In one illustrative example, user interface engine 202 could be a Web browser or an extension to a Web browser.

User interface engine 202 may be metadata driven. The metadata may describe a page and page layout of an overall web page without content. User interface engine 202 loads metadata for the page and then run queries against local or remote databases to get customer data used for constructing applications. User interface engine 202 may then perform interpretation of the metadata and retrieved data, presenting an interface customized for each user.

The metadata may take the form of a document object model (DOM) tree composed of JSON (JavaScript Object Notation) objects, though metadata may be composed of multiple data models. The document object model tree is a tree representation of an abstract syntactic structure of source code, independent of any particular representation or encoding. Each node of the tree denotes a construct occurring in the source code. As opposed to parse trees, typically built by a parser during a source code translation and compiling process, the document object model tree can be "abstract," in that it is independent of any particular representation or encoding, and does not represent every detail appearing in the real syntax.

Underlying the user interface, user interface engine 202 may include one or more modules. As depicted, user interface engine 202 includes tile renderer module 204, binding module 206, and business rule and workflow module 208. Each module may be considered a collection of software or computer code which implements the functionality of the module.

Tile renderer module 204 is computer code which computer 210 may use to render tiles on tangible user display device 212. Tile renderer module 204 may receive input from the user, from binding module 206, and from business rule and workflow module 208 to change and manipulate both the functionality of computer 210, which is used to execute tile renderer module 204, as well as tangible user display device 212, which is used to display rendered tiles.

Binding module 206 is computer code which computer 210 may use to bind data and structured data objects to the user interface, possibly a browser, so that user interface engine 202 may keep track of all of the data and structured data objects used in executing business rules and workflows, as well as rendering tiles. Additional details regarding the functionality of binding module 206 is described below with respect to how data and structured data objects are used in user interface engine 202.

Business rule and workflow module 208 is computer code which computer 210 may use to create, join, merge, or otherwise manipulate composable data nodes in order to create miniapps, collections, and bundles.

Business rule and workflow module 208, using data and structured data objects tracked by binding module 206, is the underlying code which allows a user to manipulate tiles rendered by tile renderer module 204 and thereby create miniapps, collections, and bundles without the user having to code any of the software being developed. Business rule and workflow module 208 may use composable data nodes, together with work flows and business rules to create the miniapps, collections, or bundles in a user-perceived codeless development environment.

Structured data object interpreter 214 is hardware or software which is used to interpret or execute business rules in a business system. Interpreter 214 can be software residing in a Web browser on computer 210. However, the illustrative embodiments are not necessarily limited to only client computers or Web browsers.

Interpreter 214 is a code interpreter designed for a domain-specific language entirely composed of structured data objects. In one illustrative example, interpreter 214 takes the form of an abstract syntax tree (AST) interpreter with the exception that the abstract syntax tree (AST) structure is composed of well-defined data nodes constructs, joined together in a domain-specific language. Because the data node constructs are well-defined when they are constructed, interpreter 214 executes the composition of structured data objects without compilation. Data note constructs are composed into well-defined structured data objects according to selected block types and properties, replacing the tokenization and parsing that would otherwise occur during compilation.

In some illustrative embodiments, user interface engine 202 may take advantage of some server side services operating on one or more server computers, such as server computer 216. "Server side" means that computer 210 communicates with server computer 216, possibly over a network such as the Internet. Server side resources are provided to support user interface engine 202. While not always necessary for implementation of user interface engine 202, server side resources can enhance the functionality of user interface engine 202.

For example, the server side resources may include user interface engine orchestrator 218. In some exemplary illustrative embodiments, user interface orchestrator 218 may be considered part of user interface engine 202 such that user interface engine 202 operates partially both on computer 210, but also on one or more server computers, such as server computer 216.

User interface orchestrator 218 may serve as a proxy to speed up processing of user interface engine 202. User interface orchestrator 218 may retrieve structured data objects and then identify whether data queries are for customer data, business rules, or any other structured data objects. User interface orchestrator 218 may then request such data, objects, or code, from the data center operating server side. User interface orchestrator 218 may cache retrieved data, structured data objects, code, workflows, or objects to be sent back to user interface engine 202.

Server side services may include other components other than user interface orchestrator 218. For example, server side resources could include one or more data object and DNA engines 220, which can be used to manage or provide structured data objects for use in user interface engine 202. Server side resources may also include one or more persistence engines 222, which can be used to save work done using user interface engine 202. Server side resources may also include business rule engine 224, which may be used to create or store business rules that are used by user interface engine 202 in the user-perceived codeless building of miniapps, collections, and bundles.

Server side resources may also include workflow engine 226, which may be used to create or store workflows that are used by user interface engine 202 in the user-perceived codeless building of miniapps, collections, and bundles.

Server side resources may also include user interface test engine 228, which may be used to test both the functionality of user interface engine 202, possibly as well as the miniapps, collections, and bundles created using user interface engine 202.

Figure 3:
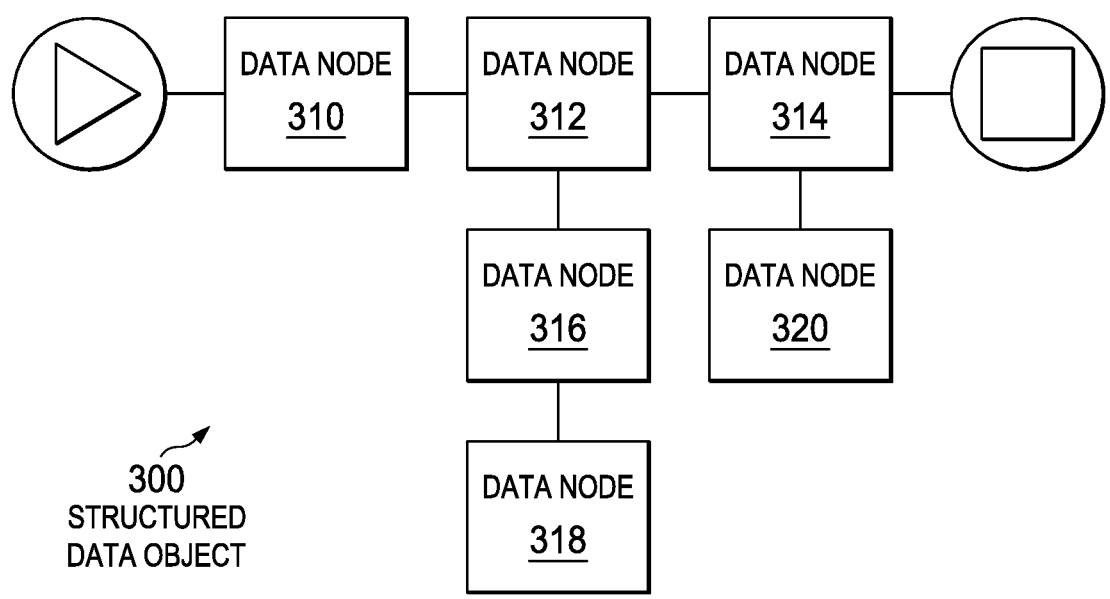
FIG. 3 is a block diagram of a structured data object in accordance with an illustrative embodiment.

With reference next to FIG. 3, an illustration of a block diagram of a structured data object is depicted in accordance with an illustrative embodiment. Structured data object 300 is an example of a composition of well-defined data nodes that can be linked together according to a domain specific language to create miniapps, collections, or bundles in a user-perceived codeless development environment, such as application development system 200 of FIG. 2.

Structured data object 300 includes data nodes 310, 312, and 314. Data nodes 310, 312, and 314 are well-defined structured data objects that can be manipulated within data and structured data binding module 206 of FIG. 2 to create desired business rules. Tile renderer module 204 of user interface engine 202 may visually present data nodes 310, 312, and 314, enabling the user to build different business rules, miniapps and apps in application development system 200 of FIG. 2. Each of data nodes 310, 312, and 314 correlate to one or more functions, which in turn can be interpreted by interpreter 214 of FIG. 2 for implementing the corresponding business rule. The different permutations of the compositions of these functions, as well as differentiated input, enable the execution of the different business rule behaviors at runtime.

The functions of data nodes 310, 312, and 314 operate inside of a context defined at the beginning of the business rule execution step, which is the target object for all symbols defined in the course of the business rule execution, as well as for all input to and output from the business rule itself. In this manner, data nodes 310, 312, and 314 act as a configuration object to the code being executed, defining an execution context (or scope being executed against) to other joined data nodes.

For example, structured data object 300 further includes data node 316. Data node 316 provides additional context for execution of related data node 312. Specifically, data node 316 may indicate that data node 312, as well as child data nodes thereof, should be interpreted within the context of data node 316.

Structured data object 300 further includes data node 318. Data node 318 provides additional context for execution of both related data node 312 and data node 316. For example, data node 318 may indicate that information required for execution of data node 312 should be requested and received from one or more web services. Data node 318 requests and returns the same context updated with the information received through the web services.

Structured data object 300 further includes data node 320. Data node 320 provides additional context for execution of related data node 314. Specifically, data node 320 may indicate a consuming service for receipt of business rule output provided by related data node 314. Data node 320 requests and returns information to a consuming service, such as a web page.

Figure 4:
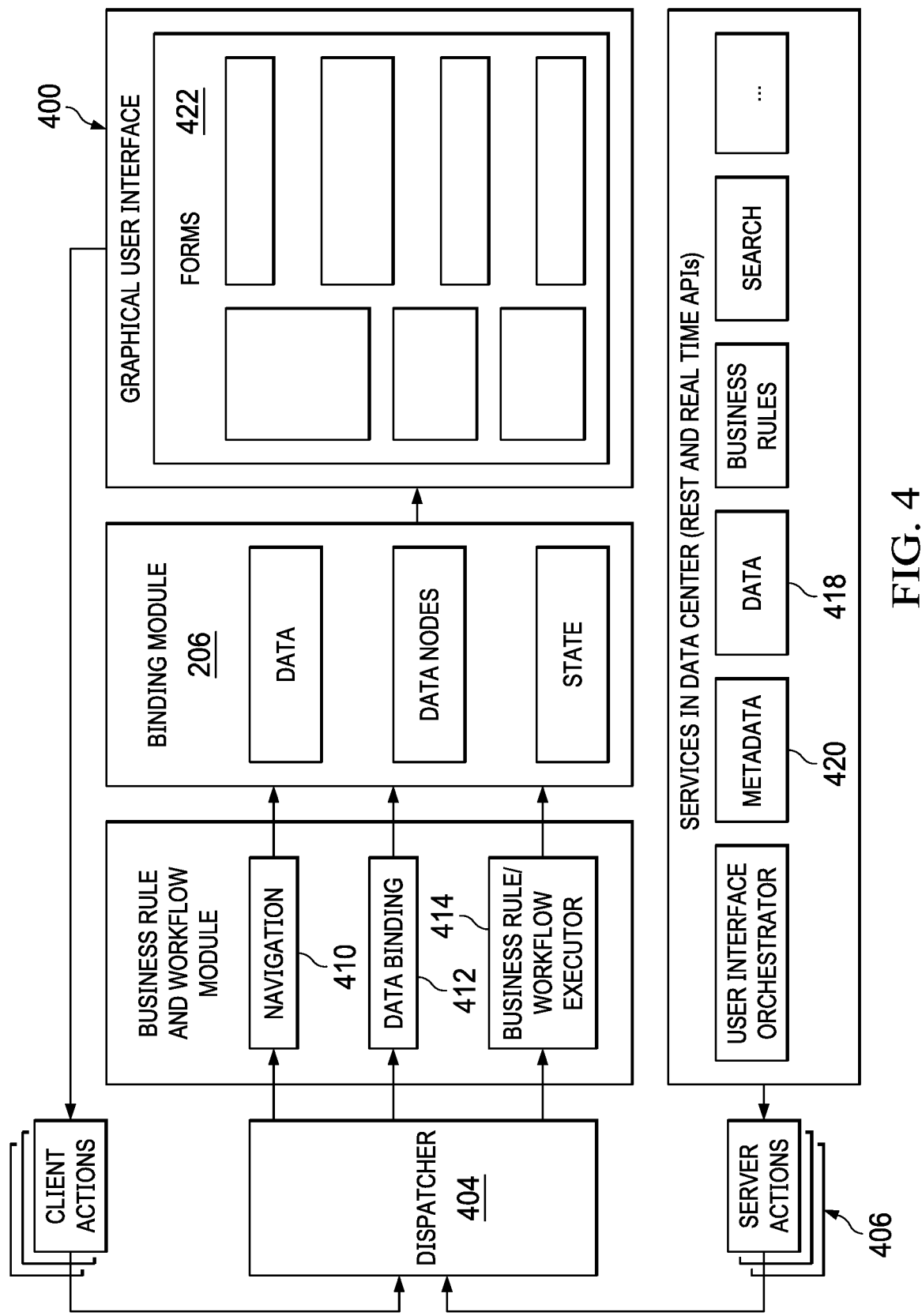
FIG. 4 is a block diagram of an example of an operation of a user interface engine in accordance with an illustrative embodiment.

FIG. 4 is an illustration of a block diagram of an example of an operation of user interface engine 202 shown in FIG. 2, in accordance with an illustrative embodiment. The example shown in FIG. 4 does not necessarily limit operation of user interface engine 202 as shown in FIG. 2. Nevertheless, FIG. 4 may be read in conjunction with FIG. 2.

In an illustrative embodiment, tile renderer module 204 in FIG. 2 may be used to generate graphical user interface 400. Graphical user interface 400 may take the form of tiles shown in a Web browser. Each tile may represent a building block. Alternatively, a tile may represent a miniapp, a collection, or even a bundle. Users may interact with graphical user interface 400, triggering, for example, a "view actions" command 402.

These actions are sent to dispatcher 404, which may be part of user interface engine 202, shown in FIG. 2. Dispatcher 404 may send the actions to the business rule and workflow module via subscriptions registered with dispatcher 404. Dispatcher 404 may also send server actions 406 sent by data center 408 to business rule and workflow module 208 in FIG. 2 for use in combination with the actions started by the user.

Business rule and workflow module 208 may run queries and apply business rules and other logic. Business rule and workflow module 208 may provide navigation 410, data binding 412, and execution by business rules and workflows executor 414.

Data and metadata binding module 206 may apply changes to user interface state 416 held in memory. User interface state 416 may be held in a tree structure containing data 418, metadata 420, and tile state. In turn, tile renderer module 204 in FIG. 2 may render graphical user interface 400. Tile renderer module 204 may listen to state changes in the tree structure and efficiently update only data 418 and metadata 420 that need re-rendering.

Figure 5:
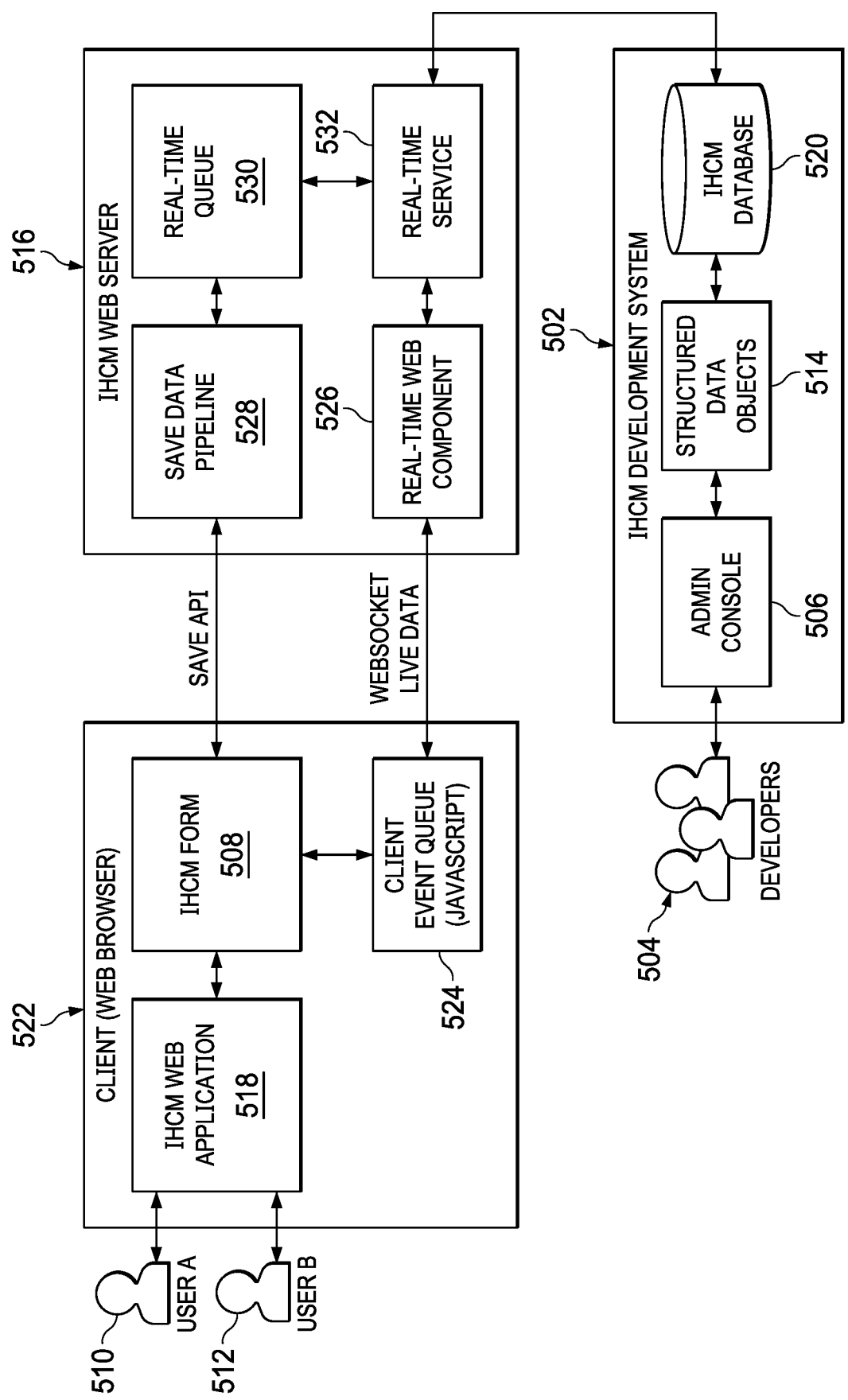
FIG. 5 is an illustration of a block diagram of a real-time data update environment in accordance with an illustrative embodiment.

With reference next to FIG. 5, an illustration of a block diagram of a real-time data update environment is depicted in accordance with an illustrative embodiment. In this illustrative example, real-time data update environment 500 includes development system 502. Application development system 502 is an example of a user-perceived codeless development system, such as application development system 200 of FIG. 2, in which developers 504 manipulate structured data objects to build at least one of business rules, miniapps, and apps according to a domain-specific language.

Using admin console 506 of development system 502, developers 504 can create and configure the forms 508 for which real-time updates can be implemented. Admin console 506 is an example of computer 210 of FIG. 2, providing client-side services for development system 502. Forms 508 is an example of forms 422 of FIG. 4. Forms 508 can be forms that require data to be edited and viewed by multiple users, such as user A 510, and user B 512.

Forms 508 may be defined by one or more structured data objects 514. Structured data objects 514 are examples of structured data object 300 of FIG. 3. In this illustrative example, structured data objects 514 are configured for real-time data updates. In an illustrative example, structured data objects 514 define a client server integration pattern that, when implemented in forms 508, get real-time live data from the Web server 516 without having to refresh the display of form 508 by Web application 518. Structured data objects 514 may be stored in database 520.

In one illustrative example, User A 510 logs into the web application 518 and opens a form 508. In response, Web server 516 identifies the structured data objects 514 corresponding to form 508, and sends the structured data objects 514 to client 522 of user A 510. In this illustrative example, client 522 is implemented as software in the form of a web browser.

Web application 518 interprets structured data objects 514 and, based on an indication the metadata object 514, determines whether real-time update is enabled for the form 508. if real-time updates are enabled, web application 518 creates an event queue 524, and establishes a connection to the real-time Web component 526 of Web server 516. Form 508 is now ready to receive real-time updates from Web server 516.

In one illustrative example, Web application 518 connects to real-time Web component 526 via a SignalR Hub API that allows server code to send asynchronous notifications to client-side web applications. SignalR is a software library for Microsoft ASP.NET.

Real-time Web component 526 takes advantage of several transports, automatically selecting the best available transport given the client's and server's best available transport. When available, the connection between Web application 518 and real-time component 526 can be a websocket connection that enables bi-directional communication between the browser and server. When an upgraded connection is unavailable, real-time Web component 526 falls back to other connection techniques and technologies, such as HTTP.

Whenever data is entered and saved in a metadata form 508, save data pipeline 528 is called. Save data pipeline 528 may be implemented in any appropriate manner. For example, save data pipeline 528 may be implemented as a stream processing platform using Apache Kafka open-source stream processing software platform or any other appropriate stream processing platform. Save data pipeline 528 may be implemented as part of, or separate from, a document storage system, in whole or in part.

Save data pipeline 528 knows the status of form 508. Save data pipeline 528 compares form 508 with its previous state and produces a delta object that depicts any changes made by the user. save data pipeline 528 creates a JSON syntax from the Delta object and pushes the JSON to real-time queue 530. real-time queue 530 holds the JSON until it is consumed by real-time service 532.

In this example, real-time service 532 may be referred to as a subscribing application. In this example, real-time service 532 is configured to perform corresponding actions in response to the storage of individual documents and forms, as identified from event message is generated by save data pipeline 528. Therefore, in this example, real-time service 532 will receive the JSON from real-time queue 530. real-time service 532 may then perform corresponding actions based on the information contained in the JSON.

Real-time service 532 may convert the JSON into an appropriate form for delivery to and use by client 522. For example, in one illustrative example, real-time service 532 creates a real-time message by compressing the JSON data to a record ID, data source, changed values and removes unmodified data. The compressed JSON is then passed to real-time Web component 526.

Real-time Web component 526 then checks for connected clients, such as one or more of client 522, and security real-time Web component 526 then publishes the real-time message to the clients that are connected.

A message or signal generated by real-time Web component 526 may be delivered to client 522 via an appropriate network connection. The connection may be, for example, without limitation, a wired connection, a wireless connection, a fiber optic connection, or any other appropriate connection or combination of connections for delivering a signal or message from real-time web component 526 to client 522.

In one illustrative example, the real-time message is a packet that contains the name and parameters of the to-be-called method is sent across the active transport. In one illustrative example, when an object is sent as a method parameter, it is serialized using JSON. The client then matches the method name to methods defined in client-side code. For example, if the update matches the record ID/form that the user has opened, the message is considered useful and the event is added into the queue. However, if the update does not match the record ID/form, the updates are discarded.

Web application 518 uses the deserialized parameter data when interpreting the data nodes of metadata object 514. For example, the change values received in real-time message can be interpreted by Web application 518 to override the default values previously retrieved from database 520.

User A 510 gets the notifications in real-time to see these changes updated by user B 512. In one illustrative example, user A 510 is then shown/prompted with messages regarding changes made by user B 512. For example, user A may be prompted when user B 512 adds a new record to IHCM database 520, when user B 512 has opened a form for editing a record that is being viewed by User A 510, or when user B 512 has updated a record that is being viewed by user A 510. In one or more illustrative examples, user A 510 may be prompted to update the records displayed, discard changes made by user B 512, or merge the display record changes made by user B 512.

Figure 6:
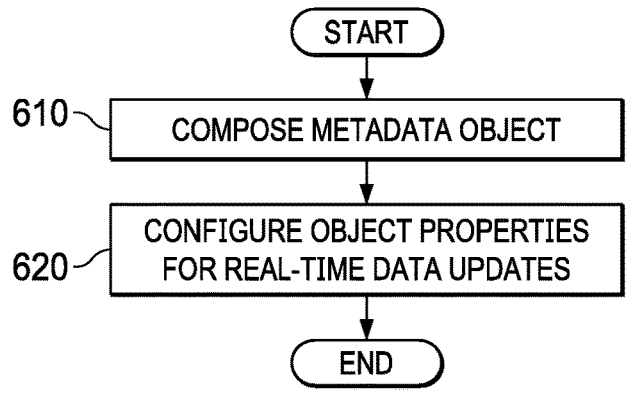
FIG. 6 is a flowchart of a process for composing a metadata object in accordance with an illustrative embodiment.

With reference next to FIG. 6, a flowchart of a process for composing a metadata object is depicted according to an illustrative example. The process of FIG. 6 may be implemented as operations performed by application development system 200, shown in block form in FIG. 2.

Using an application development system, developers, such as developers 504, compose metadata object (step 610). The metadata object can be structured data object 300, shown in block form in FIG. 3.

Using an application development system, developers, such as developers 504, configure object properties for real-time data updates (step 620), with the process terminating thereafter. The metadata object can then be saved in a database, such as I HCM database 520 of FIG. 5, for consumption by a Web application, such as web application 518 of FIG. 5.

Figure 7:
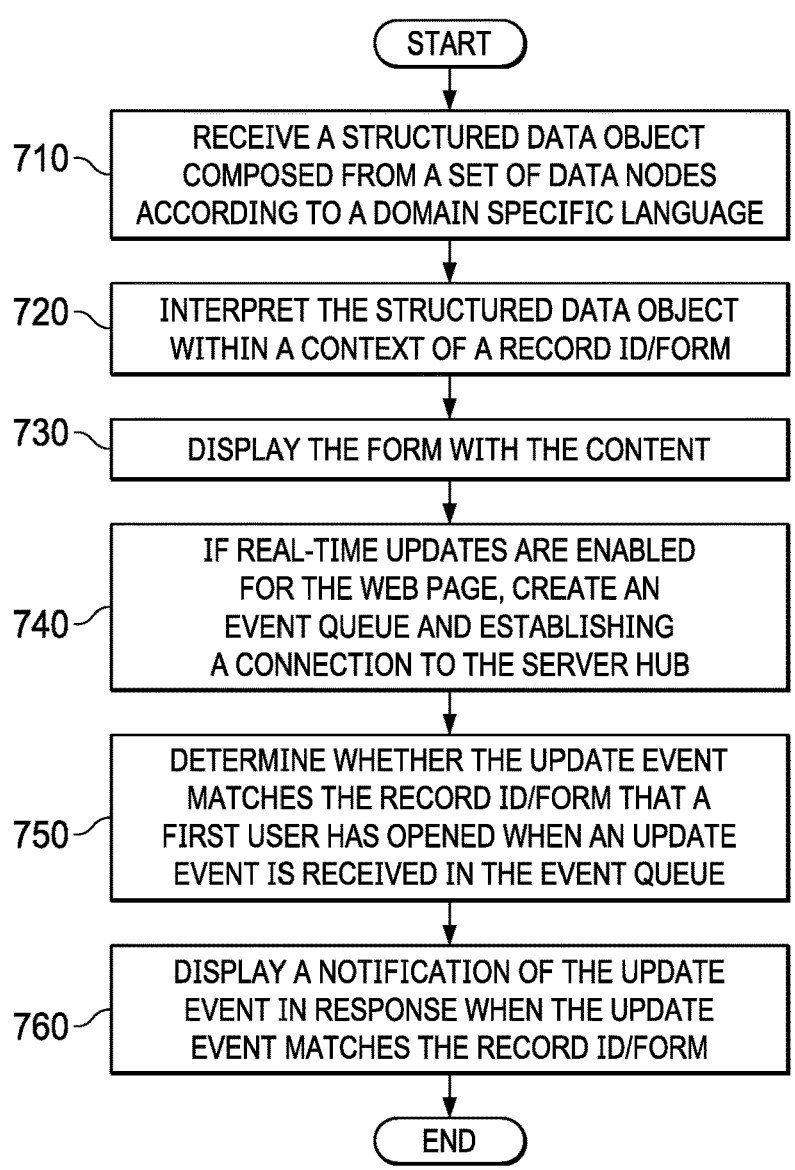
FIG. 7 is a flowchart of a process for displaying a real-time update enabled web page in accordance with an illustrative embodiment.

With reference next to FIG. 7, a flowchart of a process for communicating real-time updates among web clients is depicted according to an illustrative example. The process of FIG. 7 may be implemented as operations performed by web application 518, shown in block form in FIG. 5.

The process begins by receiving a structured data object composed from a set of data nodes according to a domain specific language (step 710). The structured data object can be received in response to a request for access to data within a human resources database. The structured data object defines what a web page looks like without content for the web page.

The process interprets the structured data object within a context of a record ID/form (step 720). Interpreting the structured data object identifies content for the web page. Additionally, Interpreting the structured data object identifies whether real-time updates are enabled for the web page.

The process displays the webpage with the content (step 730). If real-time updates are enabled the webpage, the process creates an event queue and establishes a connection to the server hub (step 740).

When an update event is received in the event queue, the process determines whether the update event matches the record ID/form that a first user has opened (step 750). The process displays displaying a notification of the update event when the update event matches the record ID/form (step 760), and terminates thereafter.

Figure 8:
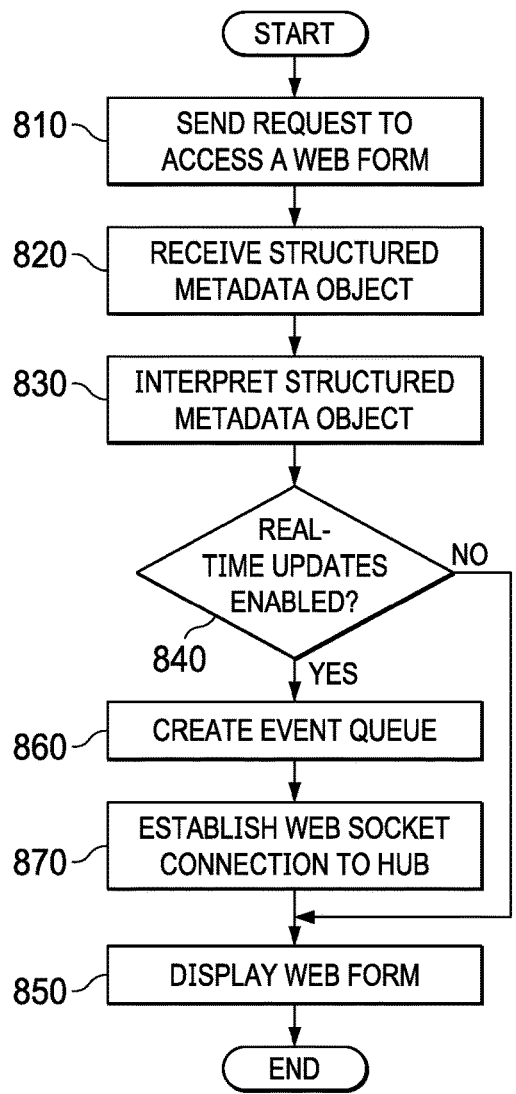
FIG. 8 is a flowchart of a process for displaying a real-time update enabled web form in accordance with an illustrative embodiment.

With reference next to FIG. 8, a flowchart of a process for displaying a real-time update enabled web form is depicted according to an illustrative example. The process is a specific example of steps 710-730 of the process of FIG. 7.

The process begins by sending a request to access a web form (step 810). The web form can be a web form 508, shown in block form in FIG. 5.

The process receives a structured metadata object (step 820). The structured metadata object is sent from a Web server, such as Web server 516, in response to receiving the request. The structured metadata object is an example of structured metadata object 300, shown in block form in FIG. 3.

The process then interprets the structured metadata object (step 830). Interpretation can be performed using structured metadata object interpreter 214 of FIG. 2. The metadata object can be interpreted to identify content for the requested form, as well as to determine whether real-time updates are enabled for the form (step 840).

If real-time updates are not enabled ("no" at step 740), the process displays the web form (step 850), with the process terminating thereafter. The web form is displayed, using data identified from the interpretation of the structured data object.

If real-time updates are enabled ("yes" at step 740), the process creates an event queue (step 860). The event queue is an example of an event queue, 524 shown in block form in FIG. 5. The process then establishes a connection to the Web server (step 870). In one illustrative example, the connection can be a web socket connection, enabling bi-directional communication between the client browser and Web server. If the upgraded connection is unavailable, the connection falls back to other connection techniques and technologies, such as HTTP. The Web server registers the connection using a Hub API that allows server code to send asynchronous notifications to client-side web applications.

The process displays the web form (step 850), with the process terminating thereafter. The web form is displayed, using data identified from the interpretation of the structured data object.

Figure 9:
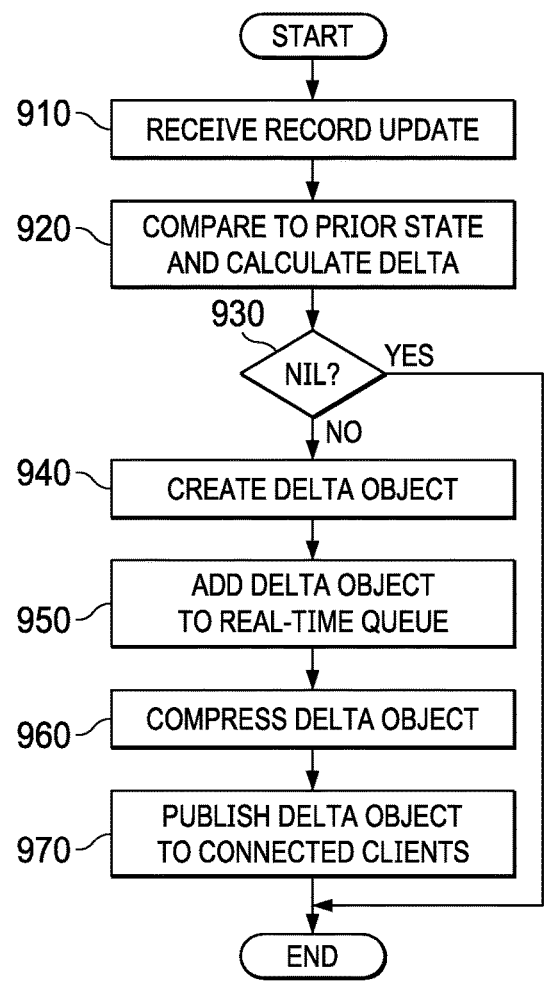
FIG. 9 is a flowchart of a process for publishing a real-time update to a real-time update enabled web form in accordance with an illustrative embodiment.

With reference next to FIG. 9, a flowchart of a process for publishing a real-time update to a real-time update enabled web form is depicted according to an illustrative example. The process may be implemented as operations performed by Web server 516, shown in block form in FIG. 5.

The process begins by receiving record update (step 910). The record update can be, for example, data that is entered and saved in a metadata form, such as metadata form 508 of FIG. 5. The record update can be, for example, the creation of a new record.

The process compares the record update to a prior state of the record, and calculates the Delta (step 920). a delta object that depicts any changes to the record made by the user received in step 910.

If the Delta object is not nil ("no" At step 930), the process creates a JSON syntax from the Delta object (step 940) and pushes the JSON to real-time queue (step 950), where the JSON is held until it is consumed by a real-time service, such as real-time service 532 of FIG. 5.

The process compresses the JSON data (step 960). For example, the process can compress the JSON data to a record ID, data source, changed values and removes unmodified data.

The process checks for connected clients, such as one or more of client 522, and publishes the real-time message to the clients that are connected (step 970), with the process terminating thereafter.

Figure 10:
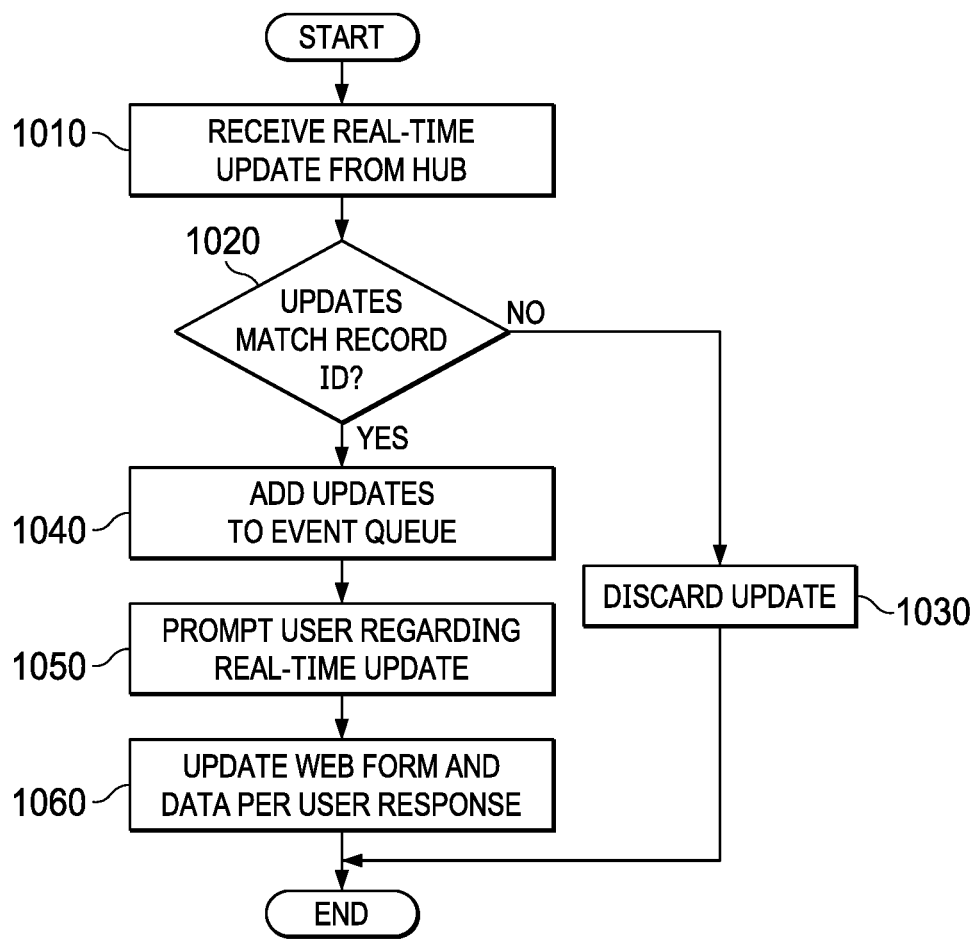
FIG. 10 is a flowchart of a process for displaying a real-time updates in a real-time update enabled web form in accordance with an illustrative embodiment.

With reference next to FIG. 10, a flowchart of a process for displaying a real-time update in a real-time update enabled web form is depicted according to an illustrative example. The process in FIG. 10 is a specific example of steps 750-760 of process 700 of FIG. 7.

The process begins by receiving a real-time update from the Web server (step 1010). In one illustrative example, the real-time update is received via a web socket connection, enabling bi-directional communication between the client browser and Web server. In another illustrative example, he update is received via other connection techniques and technologies, such as an HTTP POST.

The process then compares the record ID contained in the real-time update to record ID's of open forms (step 1020), which can be recorded in the client event queue, such as event queue 524 of FIG. 5. If the record updates do not match ("no" at step 1020), the update is considered unimportant, and is discarded (step 1030). The process terminates thereafter.

If the record updates do match ("yes" at step 1020), the process adds the real-time update to the engine two (step 1040). The process then prompts the user regarding the real-time update (step 1050), and updates the web form and data per any user response (step 1060). The process terminates thereafter.

Figure 11A:
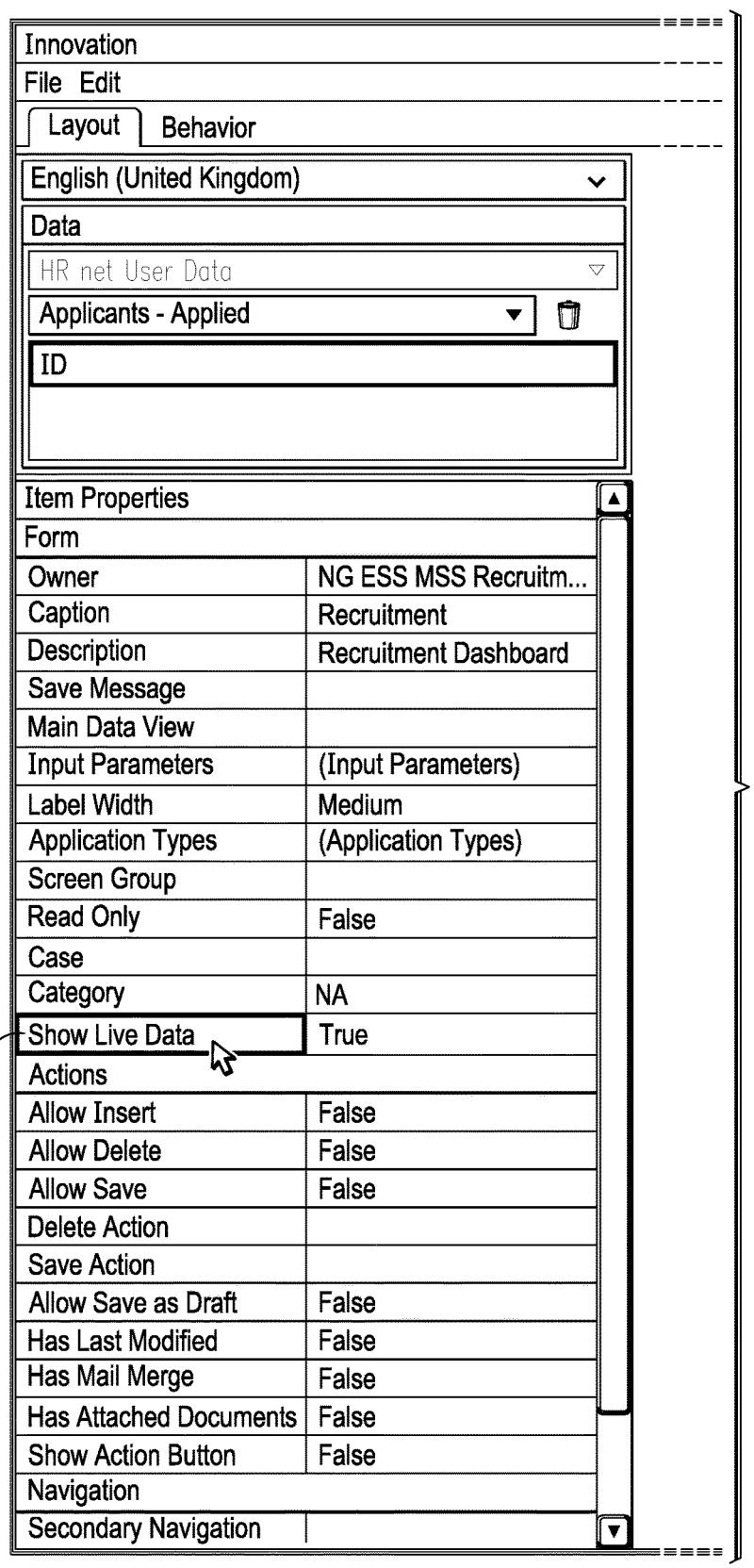
FIGS. 11A-11B are a graphical user interface for composing structured data objects in accordance with an illustrative embodiment.
Figure 11B:
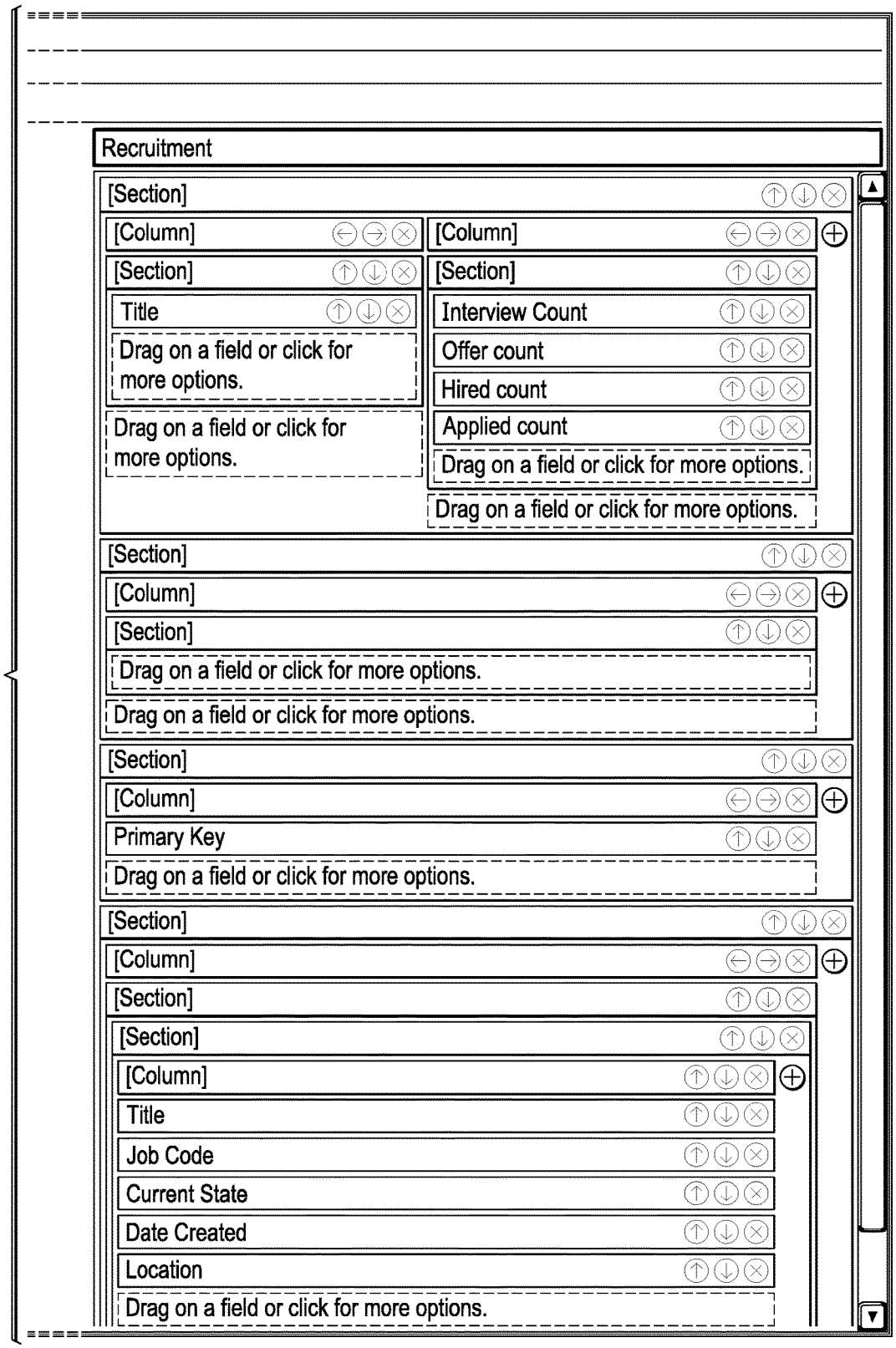

With reference next to FIGS. 11A-11B, a graphical user interface for composing structured data objects is shown in accordance with an illustrative example. Graphical user interface 1100 provides an interface to manipulate composable data nodes to build at least one of business rules, miniapps, and apps, in an application development system 200, such as application development system 200 of FIG. 2.

In this illustrative example, graphical user interface 1100 includes properties section 1110, in which system developers, such as developers 504, can configure object properties for the compose data object. Property section 1110 and includes property 1120. system developers can configure property, 1120 to enable real-time data updates for the composed data object.

Referring generally to FIGS. 12-15, a first example of graphical user interfaces for different client devices illustrating real-time updates propagated between the client devices is depicted according to an illustrative embodiment.

Figure 12:
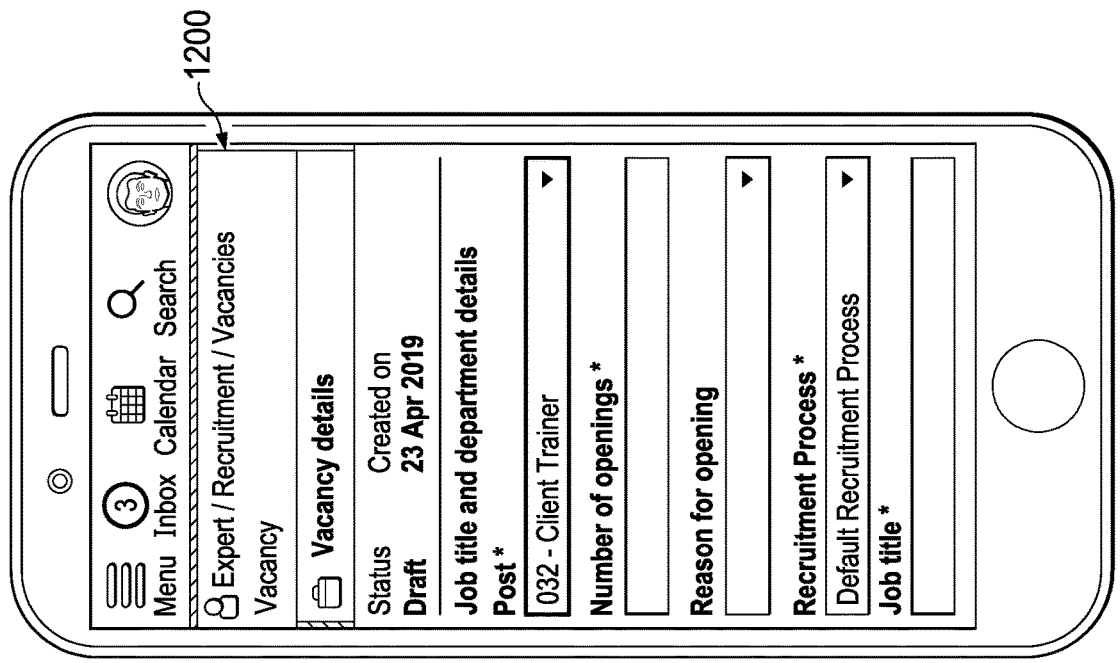
FIG. 12 is a first screen of a first graphical user interface of a first client device showing a first example of propagating real-time updates between client devices in accordance with an illustrative embodiment.

With reference specifically to FIG. 12, graphical user interface 1200 is depicted according to an illustrative example. Graphical user interface 1200 can be displayed on a first client device, such as a first one of client 522 of FIG. 5. In this illustrative example, graphical user interface 1200 is an interface for a web application, such as web application 518 of FIG. 5. In this illustrative example, a user, such as user 510 of FIG. 5, uses graphical user interface 1200 to create a new record. In this illustrative example, the record is a new record for a job posting within an organization.

Figure 13:
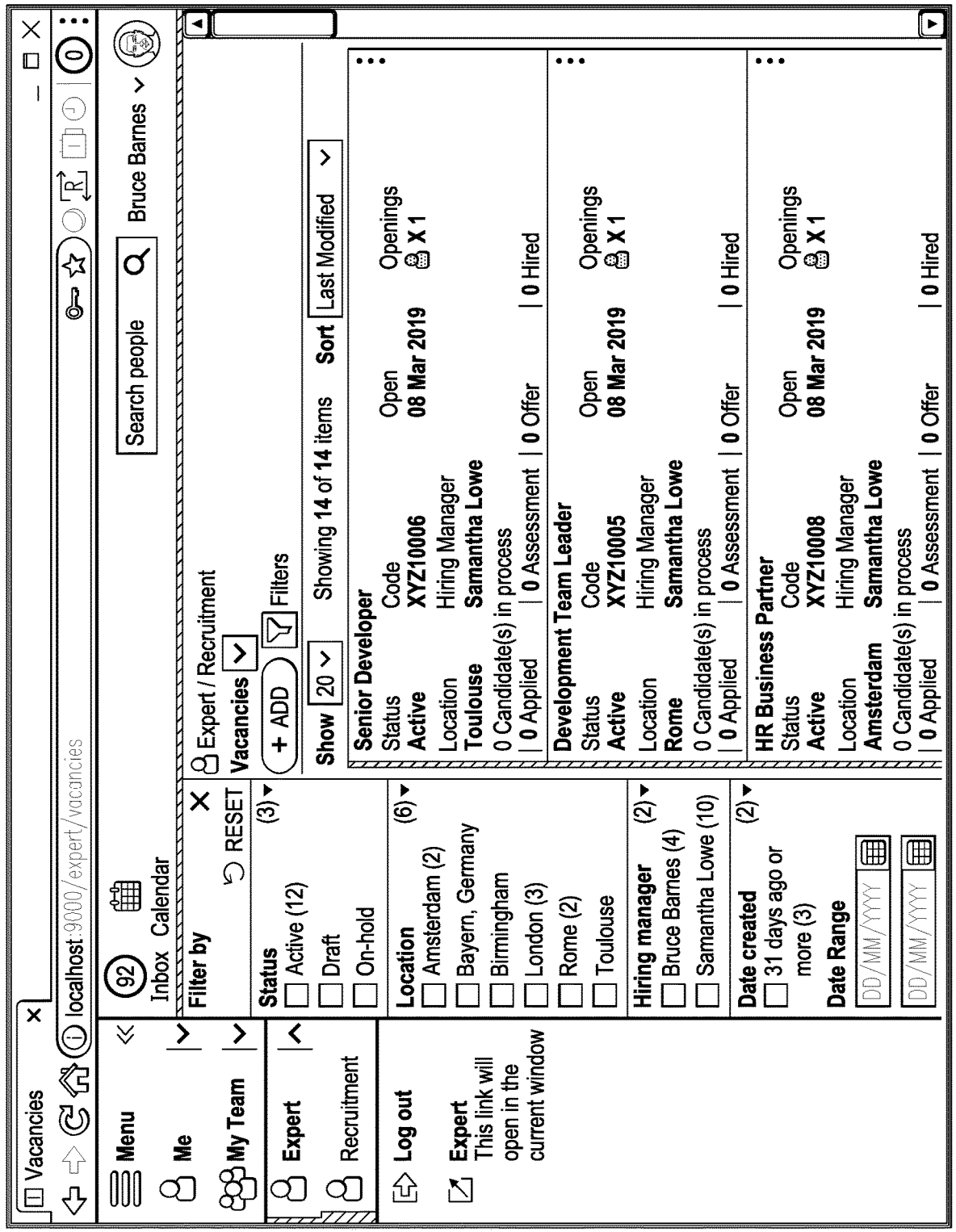
FIG. 13 is a first screen of a second graphical user interface of a second client device showing the first example of propagating real-time updates between client devices in accordance with an illustrative embodiment.

With reference specifically to FIG. 13, graphical user interface 1300 is depicted according to an illustrative example. Graphical user interface 1300 can be displayed on a second client device, such as a second one of client 522 of FIG. 5. In this illustrative example, graphical user interface 1300 is an interface for a web application, such as web application 518 of FIG. 5. In this illustrative example, a user, such as user 512 of FIG. 5, uses graphical user interface 1300 to view existing records. In this illustrative example, the existing records are for job postings within an organization.

Figure 14:
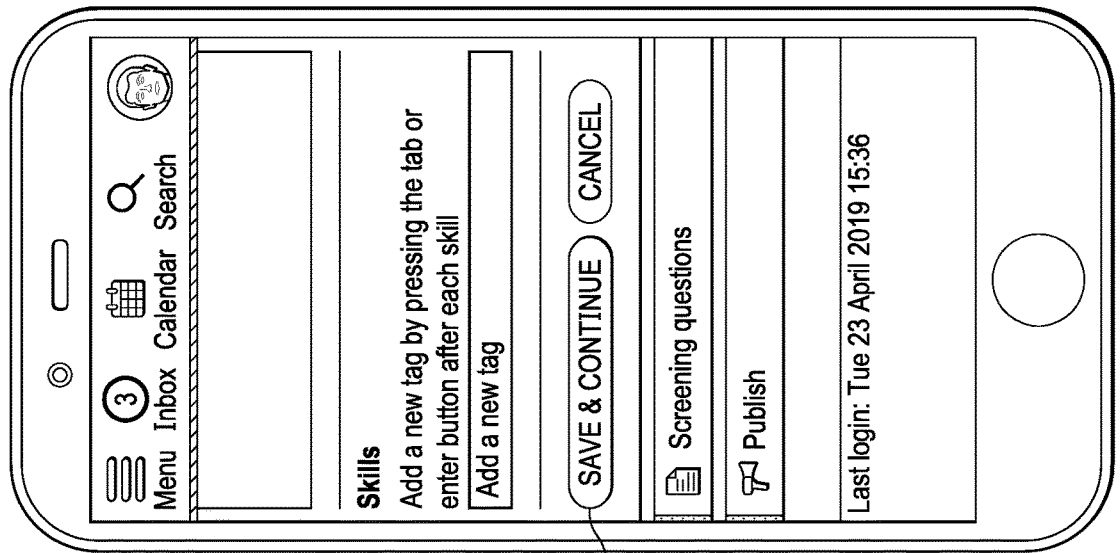
FIG. 14 is a second screen of the first graphical user interface of the first client device showing the first example of propagating real-time updates between client devices in accordance with an illustrative embodiment.

Referring now to FIG. 14, when the user has finished editing relevant information for a new record, the user saves the record, such as by interacting with control element 1410. The new record has been submitted to a save data pipeline of the corresponding Web server, such as save data pipeline 528 of FIG. 5.

Figure 15:
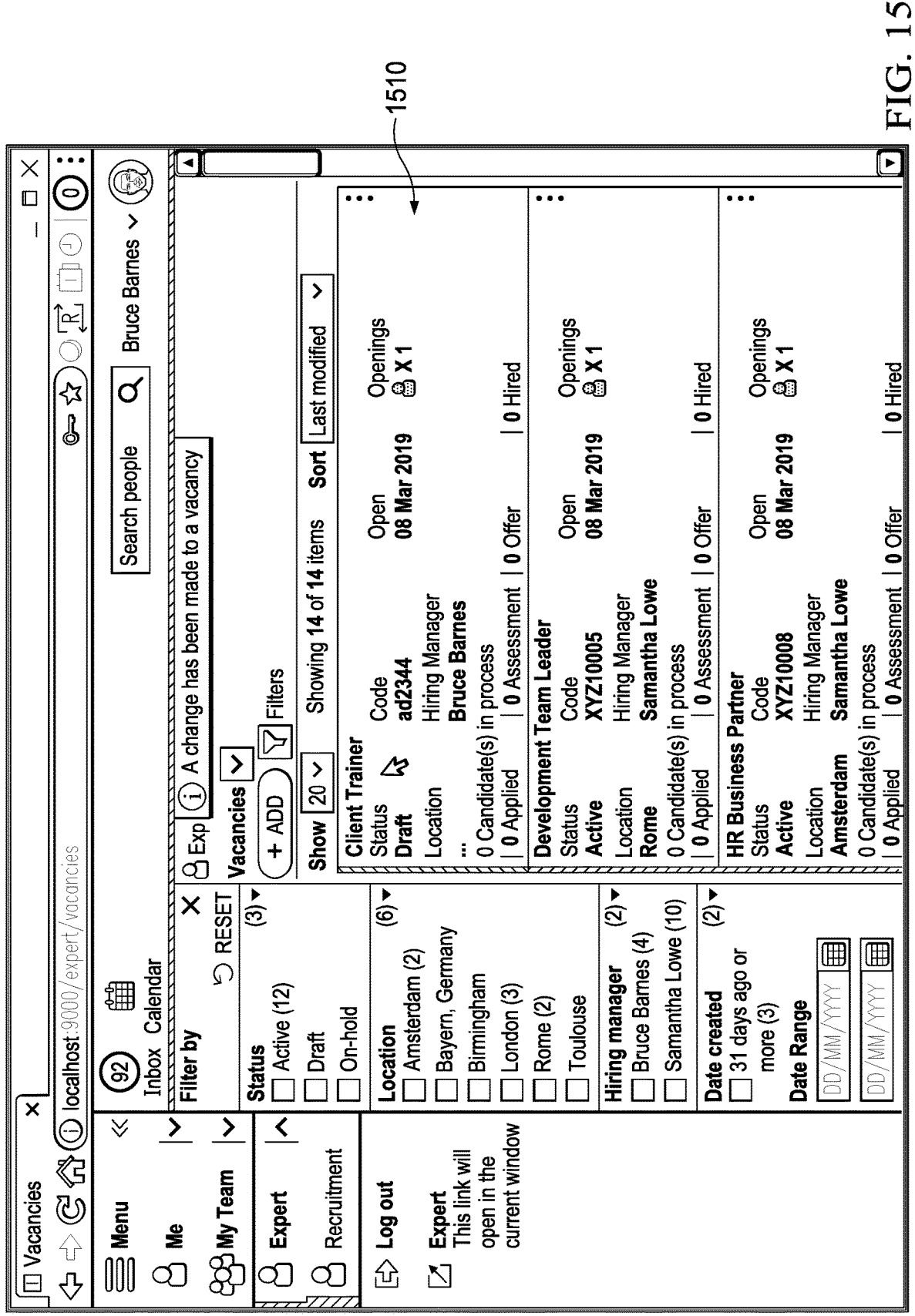
FIG. 15 is a second screen of the second graphical user interface of the second client device showing the first example of propagating real-time updates between client devices in accordance with an illustrative embodiment.

With reference next to FIG. 15, graphical user interface 1300 is updated automatically upon receipt of the new record. Graphical user interface 1300 displays new record 1510, without refreshing, reloading, or otherwise re-retrieving relevant content for the displayed webpage. Additionally, graphical user interface 1300 and display notification 1520, alerting the user regarding the new record 1510.

Referring generally to FIGS. 16-19, a second example of graphical user interfaces for different client devices illustrating real-time updates propagated between the client devices is depicted according to an illustrative embodiment.

With reference specifically to FIG. 16, graphical user interface 1600 is depicted according to an illustrative example. Graphical user interface 1600 can be displayed on a first client device, such as a first one of client 522 of FIG. 5. In this illustrative example, graphical user interface 500 is an interface for a web application, such as web application 518 of FIG. 5. In this illustrative example, a user, such as user 510 of FIG. 5, uses graphical user interface 1600 to create a new record. In this illustrative example, the record is a new record for a job candidate.

Figure 17:
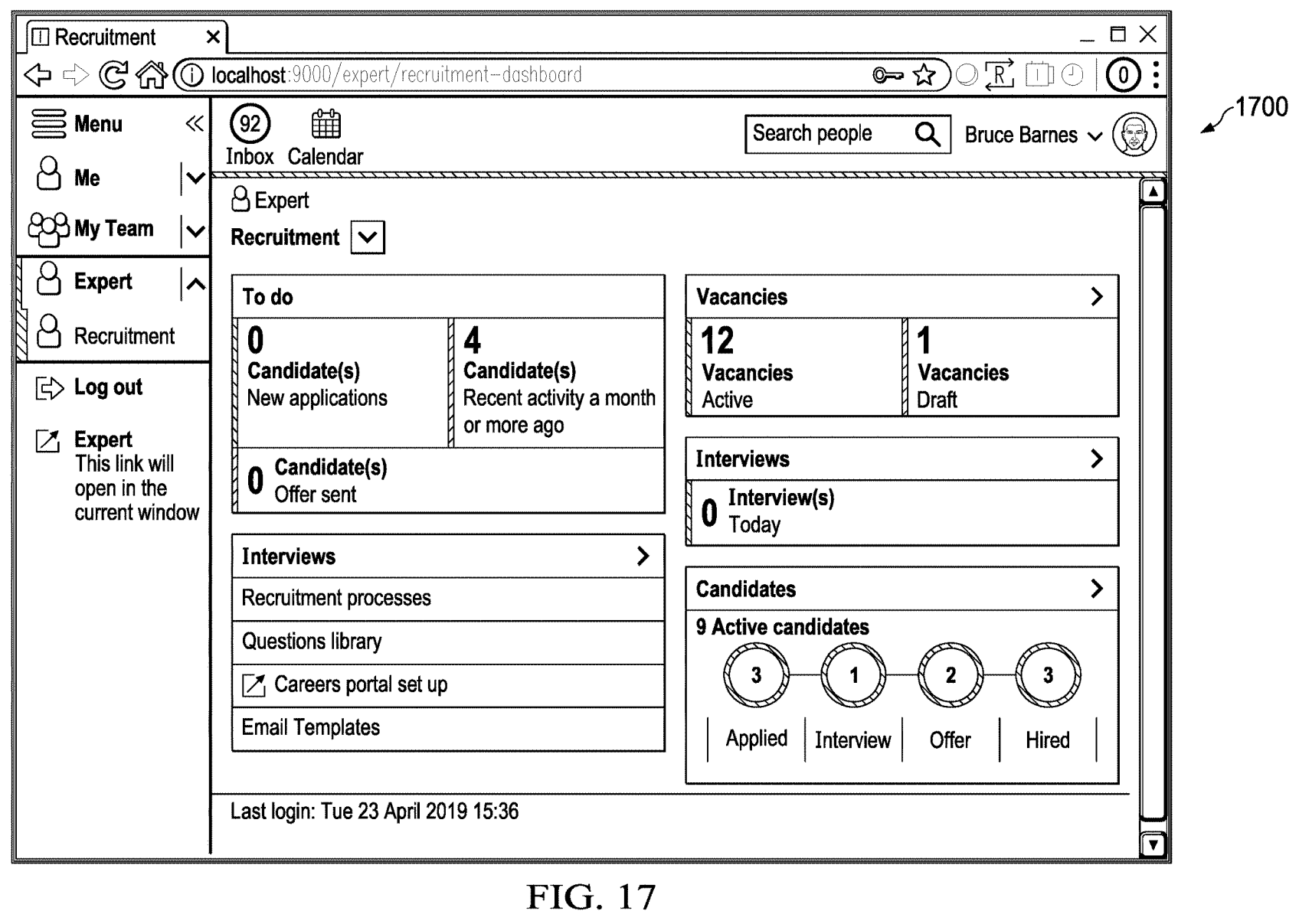

With reference specifically to FIG. 17, graphical user interface 1700 is depicted according to an illustrative example. Graphical user interface 1700 can be displayed on a second client device, such as a second one of client 522 of FIG. 5. In this illustrative example, graphical user interface 1700 is an interface for a web application, such as web application 518 of FIG. 5. In this illustrative example, a user, such as user 512 of FIG. 5, uses graphical user interface 1700 to view existing records. In this illustrative example, the existing records are for job candidates.

Referring now to FIG. 18, when the user has finished editing relevant information for a new record, the user saves the record, such as by interacting with control element 1810. The new record has been submitted to a save data pipeline of the corresponding Web server, such as save data pipeline 528 of FIG. 5.

Figure 19:
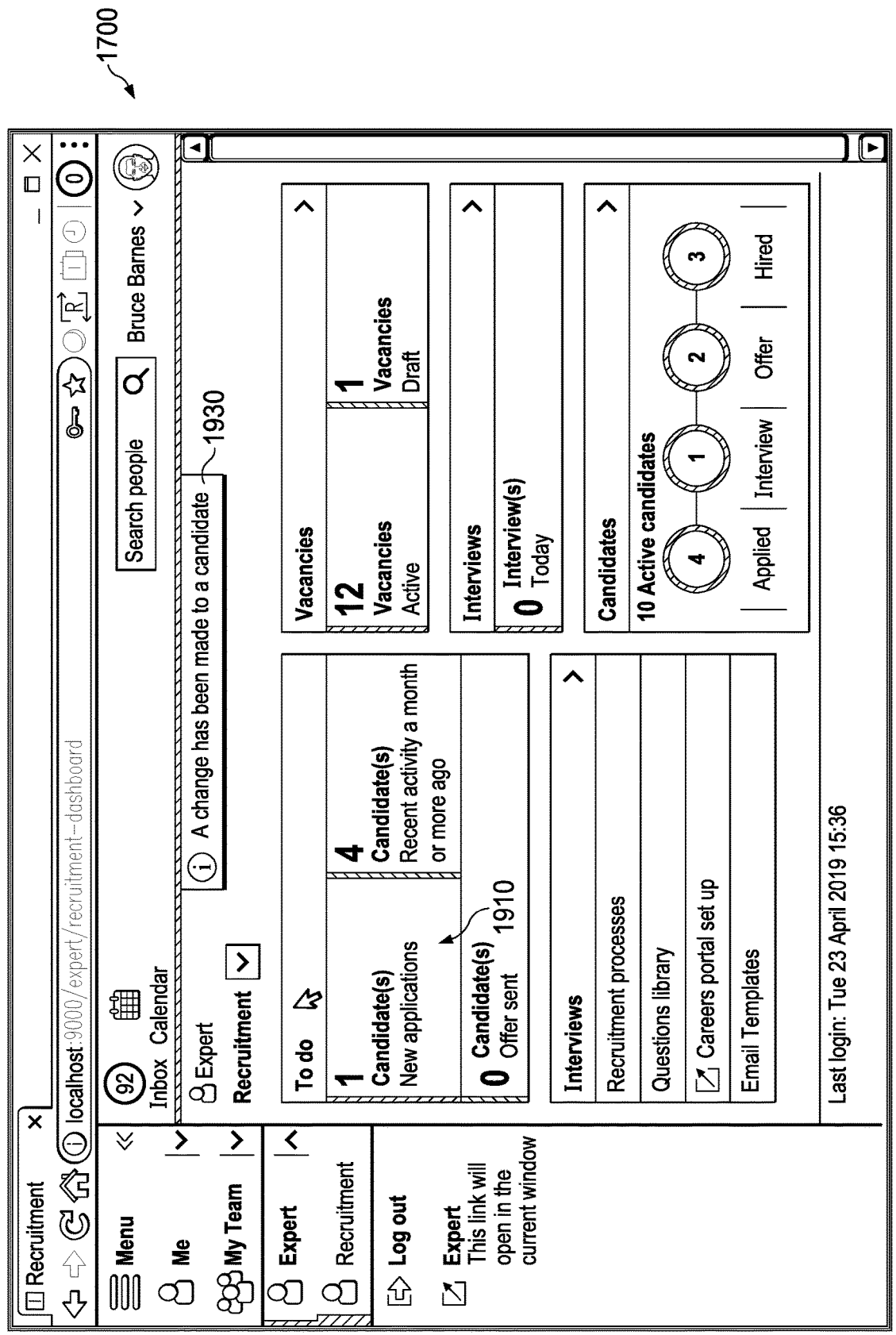
FIG. 19 is a second screen of the second graphical user interface of the second client device showing the second example of propagating real-time updates between client devices in accordance with an illustrative embodiment.

With reference next to FIG. 19, graphical user interface 1700 is updated automatically upon receipt of the new record. Graphical user interface 1700 displays new record 1910, without refreshing, reloading, or otherwise re-retrieving relevant content for the displayed webpage. Additionally, graphical user interface 1700 displays notification 1930, alerting the user regarding the new record 1910, as well as updating other relevant content of the webpage.

Referring generally to FIGS. 20-23, a third example of graphical user interfaces for different client devices illustrating real-time updates propagated between the client devices is depicted according to an illustrative embodiment.

Figure 20:
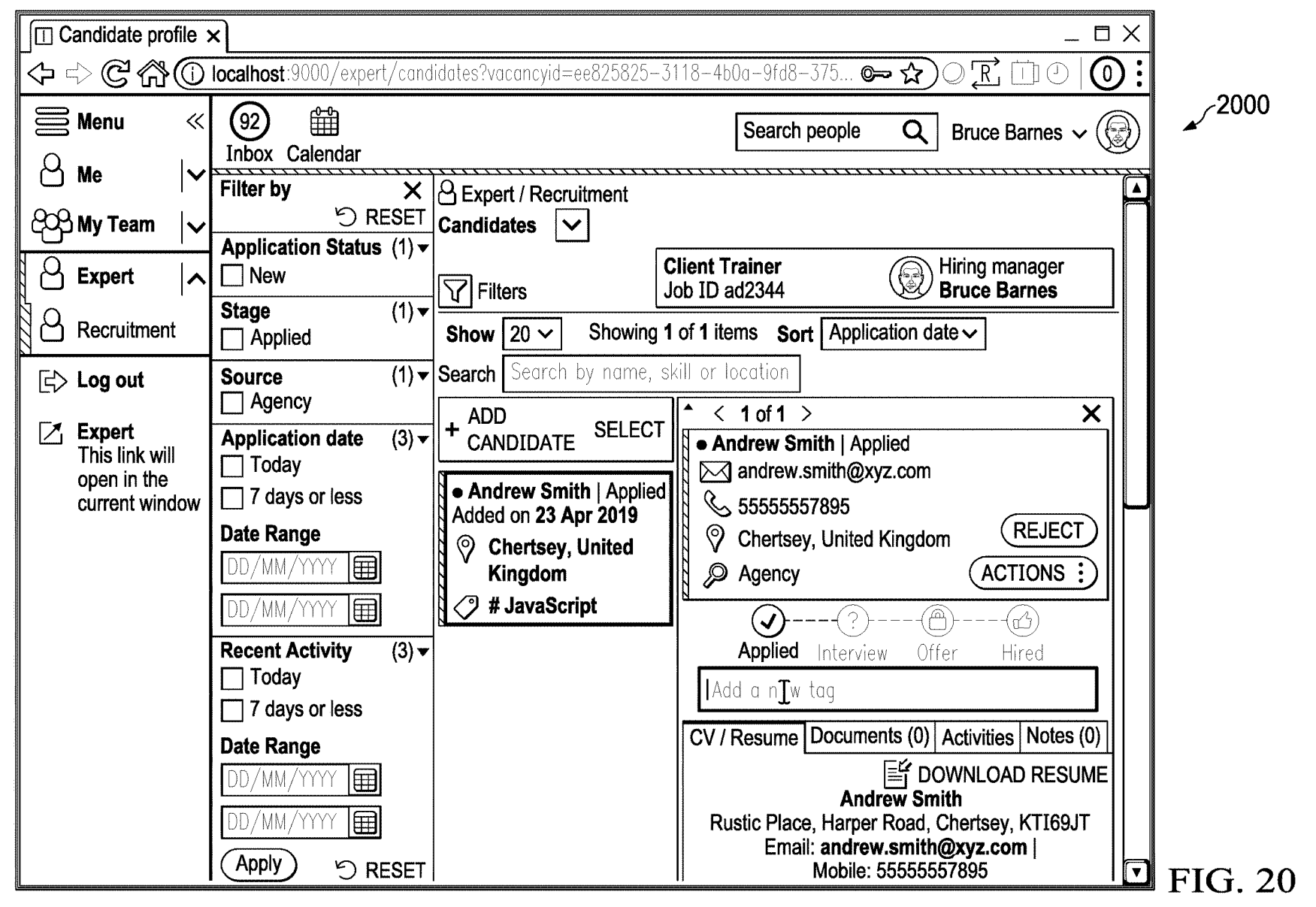

With reference specifically to FIG. 20, graphical user interface 2000 is depicted according to an illustrative example. Graphical user interface 2000 can be displayed on a first client device, such as a first one of client 522 of FIG. 5. In this illustrative example, graphical user interface 500 is an interface for a web application, such as web application 518 of FIG. 5. In this illustrative example, a user, such as user 510 of FIG. 5, uses graphical user interface 2000 to edit an existing record. In this illustrative example, the record is an existing record for a job candidate.

Figure 21:
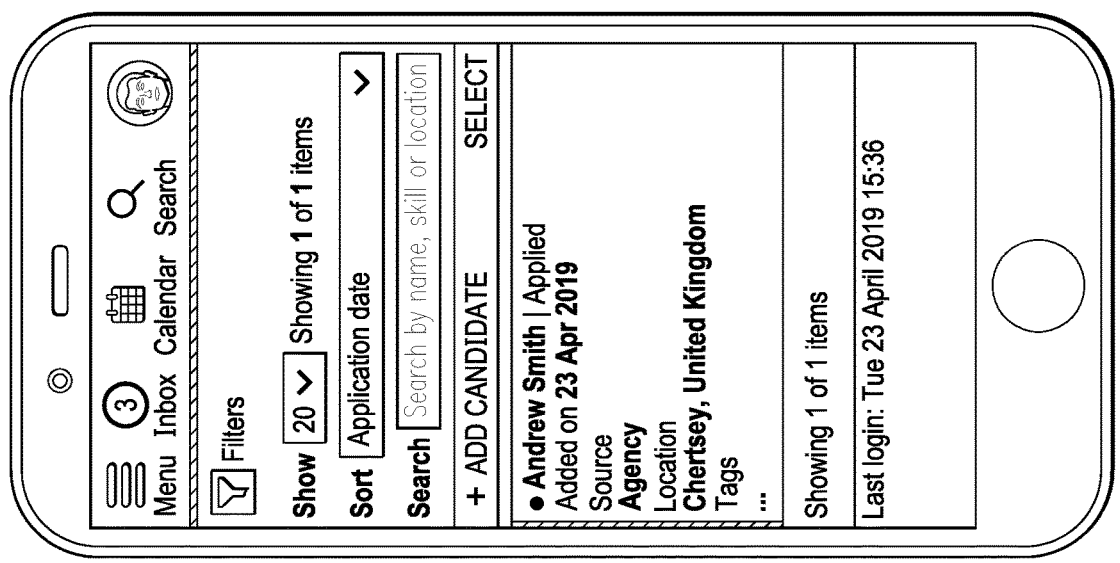
FIG. 21 is a first screen of a second graphical user interface of a second client device showing the third example of propagating real-time updates between client devices in accordance with an illustrative embodiment.

With reference specifically to FIG. 21, graphical user interface 2100 is depicted according to an illustrative example. Graphical user interface 2100 can be displayed on a second client device, such as a second one of client 522 of FIG. 5. In this illustrative example, graphical user interface 2100 is an interface for a web application, such as web application 518 of FIG. 5. In this illustrative example, a user, such as user 512 of FIG. 5, uses graphical user interface 2100 to view an existing record. In this illustrative example, the existing records is for a job candidate.

Figure 22:
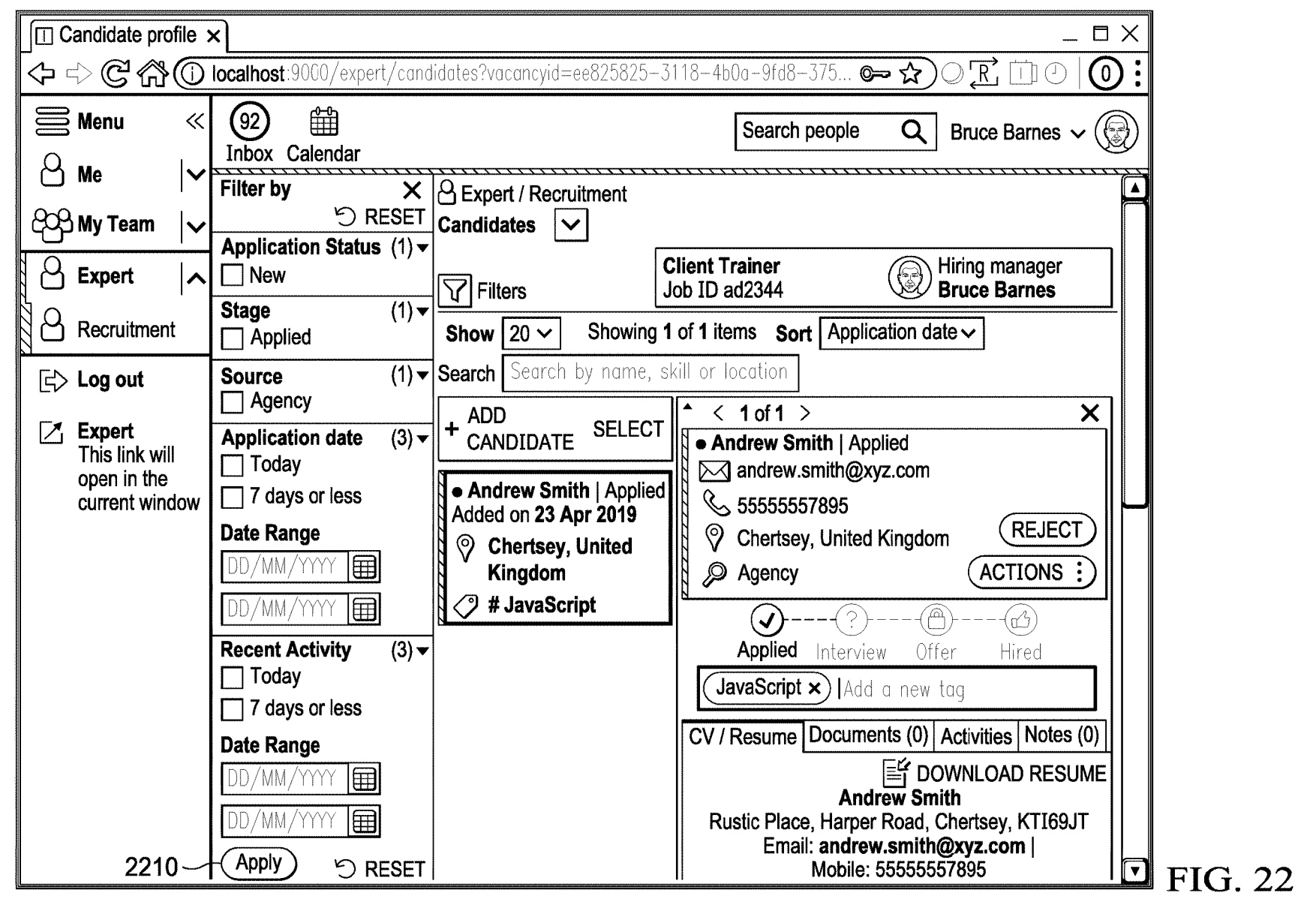

Referring now to FIG. 22, when the user has finished editing relevant information for the existing record, the user saves the record, such as by interacting with control element 2210. The new record has been submitted to a save data pipeline of the corresponding Web server, such as save data pipeline 528 of FIG. 5.

Figure 23:
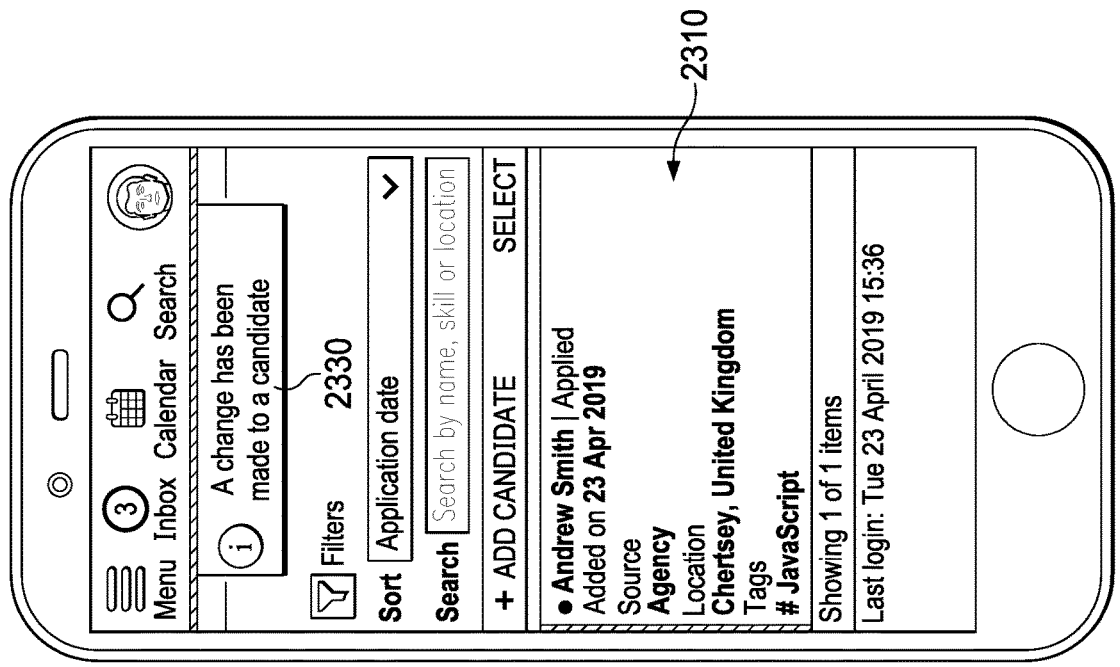
FIG. 23 is a second screen of the second graphical user interface of the second client device showing the third example of propagating real-time updates between client devices in accordance with an illustrative embodiment.

With reference next to FIG. 23, graphical user interface 2100 is updated automatically upon receipt of the new record. Graphical user interface 2100 displays the edited information 2310 of the existing record, without refreshing, reloading, or otherwise re-retrieving relevant content for the displayed webpage. Additionally, graphical user interface 2100 displays notification 2330, alerting the user regarding the edited information 2310, as well as updating other relevant content of the webpage.

Referring generally to FIGS. 24-27, a fourth example of graphical user interfaces for different client devices illustrating real-time updates propagated between the client devices is depicted according to an illustrative embodiment.

Figure 24:
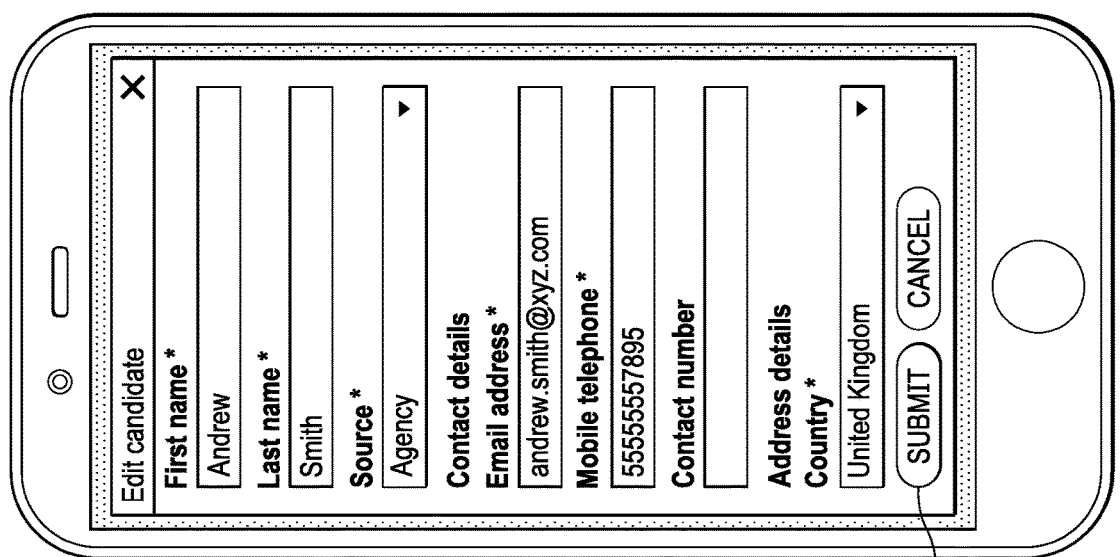
FIG. 24 is a first screen of a first graphical user interface of a first client device showing a fourth example of propagating real-time updates between client devices in accordance with an illustrative embodiment.

With reference specifically to FIG. 24, graphical user interface 2400 is depicted according to an illustrative example. Graphical user interface 2400 can be displayed on a first client device, such as a first one of client 522 of FIG. 5. In this illustrative example, graphical user interface 2400 is an interface for a web application, such as web application 518 of FIG. 5. In this illustrative example, a user, such as user 510 of FIG. 5, uses graphical user interface 2400 to edit an existing record. In this illustrative example, the record is an existing record for a job candidate.

With reference specifically to FIG. 25, graphical user interface 2500 is depicted according to an illustrative example. Graphical user interface 2500 can be displayed on a second client device, such as a second one of client 522 of FIG. 5. In this illustrative example, graphical user interface 2500 is an interface for a web application, such as web application 518 of FIG. 5. In this illustrative example, a user, such as user 512 of FIG. 5, uses graphical user interface 2500 to edit an existing record. In this illustrative example, the record is an existing record for a job candidate.

Figure 26:
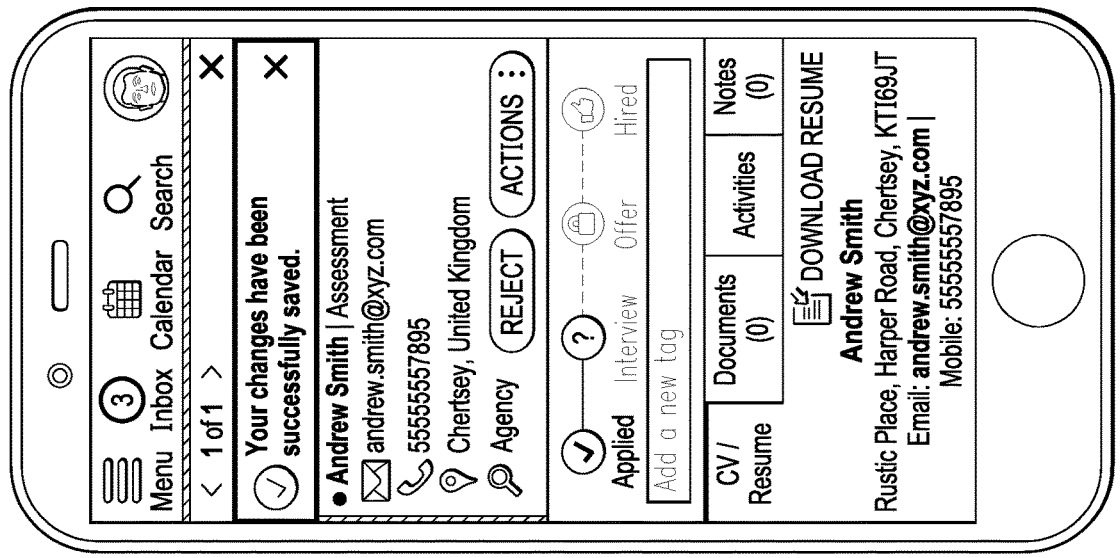
FIG. 26 is a second screen of the first graphical user interface of the first client device showing the fourth example of propagating real-time updates between client devices in accordance with an illustrative embodiment.

Referring now to FIG. 26, when the user has finished editing relevant information for the existing record, the user saves the record, such as by interacting with control element 2410. The new record has been submitted to a save data pipeline of the corresponding Web server, such as save data pipeline 528 of FIG. 5.

Figure 27:
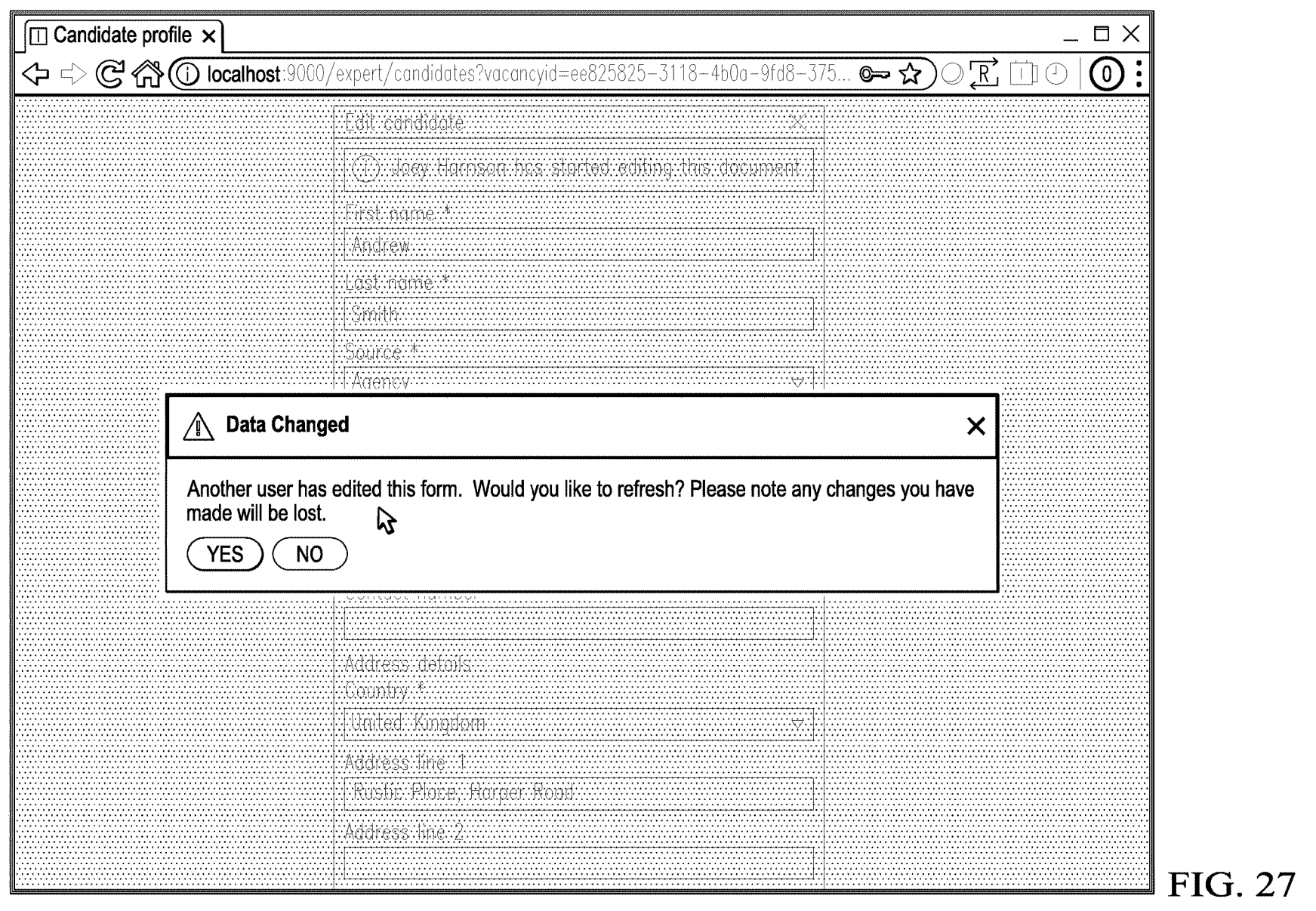

With reference next to FIG. 27, graphical user interface 2500 displays notification 2710, alerting the user that information displayed in graphical user interface 2500 has been edited by another user. Upon refresh, graphical user interface 2500 displays the record, including information that was edited using graphical user interface 2400.

Figure 28:
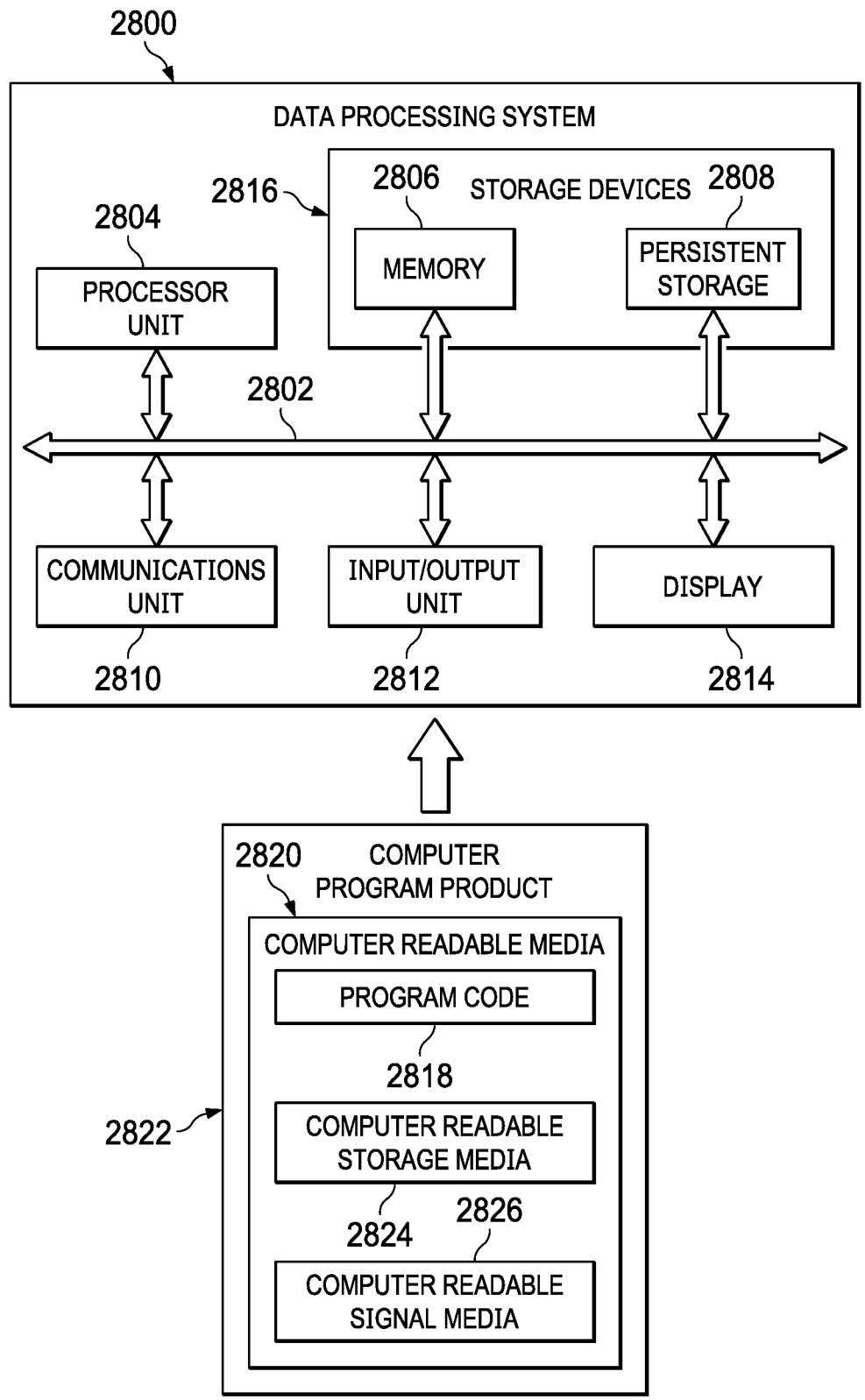
FIG. 28 is a block diagram of a data processing system in accordance with an illustrative embodiment.

Turning now to FIG. 28, an illustration of a block diagram of a data processing system is depicted in accordance with an illustrative embodiment. Data processing system 2800 may be used to implement one or more of the computers of Network data processing system 100 in FIG. 1, computer 210 and server computer 216 of FIG. 2, as well as other data processing systems that may be used in real-time data update environment 500 of FIG. 5.

In this illustrative example, data processing system 2800 includes communications framework 2802, which provides communications between processor unit 2804, memory 2806, persistent storage 2808, communications unit 2810, input/output (I/O) unit 2812, and display 2814. In this example, communications framework 2802 may take the form of a bus system.

Processor unit 2804 serves to execute instructions for software that may be loaded into memory 2806. Processor unit 2804 may be a number of processors, a multi-processor core, or some other type of processor, depending on the particular implementation.

Memory 2806 and persistent storage 2808 are examples of storage devices 2816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2816 may also be referred to as computer readable storage devices in these illustrative examples. Memory 2806, in these examples, may be, for example, a random access memory or any other suitable volatile or non-volatile storage device. Persistent storage 2808 may take various forms, depending on the particular implementation.

For example, persistent storage 2808 may contain one or more components or devices. For example, persistent storage 2808 may be a hard drive, a solid state hard drive, a flash memory, a rewritable optical disk, a rewritable magnetic tape, or some combination of the above. The media used by persistent storage 2808 also may be removable. For example, a removable hard drive may be used for persistent storage 2808.

Communications unit 2810, in these illustrative examples, provides for communications with other data processing systems or devices. In these illustrative examples, communications unit 2810 is a network interface card.

Input/output unit 2812 allows for input and output of data with other devices that may be connected to data processing system 2800. For example, input/output unit 2812 may provide a connection for user input through at least one of a keyboard, a mouse, or some other suitable input device. Further, input/output unit 2812 may send output to a printer. Display 2814 provides a mechanism to display information to a user.

Instructions for at least one of the operating system, applications, or programs may be located in storage devices 2816, which are in communication with processor unit 2804 through communications framework 2802. The processes of the different embodiments may be performed by processor unit 2804 using computer-implemented instructions, which may be located in a memory, such as memory 2806.

These instructions are referred to as program code, computer usable program code, or computer readable program code that may be read and executed by a processor in processor unit 2804. The program code in the different embodiments may be embodied on different physical or computer readable storage media, such as memory 2806 or persistent storage 2808.

Program code 2818 is located in a functional form on computer readable media 2820 that is selectively removable and may be loaded onto or transferred to data processing system 2800 for execution by processor unit 2804. Program code 2818 and computer readable media 2820 form computer program product 2822 in these illustrative examples. In one example, computer readable media 2820 may be computer readable storage media 2824 or computer readable signal media 2826.

In these illustrative examples, computer readable storage media 2824 is a physical or tangible storage device used to store program code 2818 rather than a medium that propagates or transmits program code 2818.

Alternatively, program code 2818 may be transferred to data processing system 2800 using computer readable signal media 2826. Computer readable signal media 2826 may be, for example, a propagated data signal containing program code 2818. For example, computer readable signal media 2826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2800 are not meant to provide architectural limitations to the manner in which different embodiments may be implemented. The different illustrative embodiments may be implemented in a data processing system including components in addition to or in place of those illustrated for data processing system 2800. Other components shown in FIG. 28 can be varied from the illustrative examples shown. The different embodiments may be implemented using any hardware device or system capable of running program code 2818.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for communicating real-time updates among web clients, the method comprising:
    responsive to requesting access to a data record within a human resources database, receiving, by a computer system, a structured data object composed from a set of linked data nodes according to a domain specific language from a first user,
    wherein the structured data object defines a layout for a webpage form without content for the webpage form,
    and wherein the set of linked data nodes comprises data node that provides additional execution context for other data nodes linked to the data node,
    and wherein the other data nodes linked to the data node are interpreted within context of the data node;
    interpreting, by the computer system, the structured data object within a context of a data record to identify the content for the webpage form;
    interpreting, by the computer system, the structured data object within a context of the data record to determine that the structured data object enables real-time updates for the webpage form;
    responsive to determining that real-time updates are enabled for the webpage form, creating, by the computer system, an event queue and establishing a connection to a web server, wherein the connection enables asynchronous bi-directional communication between a client browser and the web server by using an Application Program Interface that allows server code to send asynchronous notifications to client-side web applications;
    displaying, by the computer system, the webpage form with the content to the first user;
    responsive to receiving an update event in the event queue, determining, by the computer system, whether the update event matches a record identifier for the data record that is displayed in the webpage form to the first user; and
    responsive to determining that the update event matches the record identifier, displaying, by the computer system, a notification and content of the update event to a second user.

2. The method of claim 1, wherein the webpage form is a first webpage form, and wherein the update event is a notification of changes to the content for the first webpage form, wherein the changes are selected from a group consisting of an addition of a new data record by a second user, opening of a second webpage form by the second user for editing the data record that is displayed to the first user, updating of the data record by the second user, and combinations thereof.

3. The method of claim 1, further comprising:
    prompting the first user for a response in regard to the update event, wherein a prompt comprises a prompt to update the data record displayed in the first webpage form, a prompt to discard the changes made by the second user, or a prompt to merge the data record with the changes made by the second user.

4. The method of claim 1, further comprising:
updating the data record displayed in the webpage form based on information in the update event without refreshing, reloading, or otherwise re-retrieving relevant content for the webpage form.

5. The method of claim 1, wherein the connection is a web socket connection.

6. The method of claim 1, wherein the update event is a compressed JSON syntax of the data record consisting of the record identifier, a data source, and changed values of the data record, but not unmodified data of the data record.

7. A computer system for communicating real-time updates among web clients, the computer system comprising:
a hardware processor; and
a web browser, in communication with the hardware processor, wherein the web browser is configured:
responsive to requesting access to a data record within a human resources database, to receive a structured data object composed from a set of linked data nodes according to a domain specific language from a first user,
wherein the structured data object defines a layout for a webpage form without content for the webpage form,
and wherein the set of linked data nodes comprises data node that provides additional execution context for other data nodes linked to the data node,
and wherein the other data nodes linked to the data node are interpreted within context of the data node;
to interpret the structured data object within a context of a data record to identify the content for the webpage form;
to interpret the structured data object within a context of the data record to determine that the structured data object enables real-time updates for the webpage form;
responsive to interpreting the structured data object, to display the webpage form with the content to a first user;
responsive to determining that real-time updates are enabled for the webpage form, to create an event queue and establish a connection to a web server, wherein the connection enables asynchronous bi-directional communication between a client browser and the web server by using an Application Program Interface that allows server code to send asynchronous notifications to client-side web applications;
responsive to receiving an update event in the event queue, to determine that the update event matches a record identifier for the data record that is displayed in the webpage form to the first user; and
responsive to determining that the update event matches the record identifier, to display a notification and content of the update event to a second user.

8. The computer system of claim 7, wherein the webpage form is a first webpage form, and wherein the update event is a notification of changes to the content for the first webpage form, wherein the changes are selected from a group consisting of an addition of a new data record by a second user, opening of a second webpage form by the second user for editing the data record that is displayed to the first user, updating of the data record by the second user, and combinations thereof.

9. The computer system of claim 7, wherein the web browser is further configured:
to prompt the first user for a response in regard to the update event, wherein a prompt comprises a prompt to update the data record displayed in the first webpage form, a prompt to discard the changes made by the second user, or a prompt to merge the data record with the changes made by the second user.

10. The computer system of claim 7, wherein the web browser is further configured:
to update the data record displayed in the webpage form based on information in the update event without refreshing, reloading, or otherwise re-retrieving relevant content for the webpage form.

11. The computer system of claim 7, wherein the connection is a web socket connection.

12. The computer system of claim 7, wherein the update event is a compressed JSON syntax of the data record consisting of the record identifier, a data source, and changed values of the data record, but not unmodified data of the data record.

13. A computer program product comprising:
a non-transitory computer readable storage media method; and
program code, stored on the non-transitory computer readable storage media, for communicating real-time updates among web clients, the program code comprising:
code for receiving a structured data object composed from a set of linked data nodes according to a domain specific language from a first user in response to requesting access to a data record within a human resources database,
wherein the structured data object defines a layout for a webpage form without content for the webpage form,
and wherein the set of linked data nodes comprises data node that provides additional execution context for other data nodes linked to the data node,
and wherein the other data nodes linked to the data node are interpreted within context of the data node;
code for interpreting the structured data object within a context of a data record to identify the content for the webpage form;
code for interpreting the structured data object within a context of the data record to determine that the structured data object enables real-time updates for the webpage form;
code for displaying the webpage form with the content to the first user in response to interpreting the structured data object;
code for creating an event queue and establishing a connection to a web server in response to determining that real-time updates are enabled for the webpage form, wherein the connection enables asynchronous bi-directional communication between a client browser and the web server by using an Application Program Interface that allows server code to send asynchronous notifications to client-side web applications;
code for determining that an update event matches a record identifier for the data record that is displayed in the webpage form to the first user in response to receiving the update event in the event queue; and
code for displaying a notification and content of the update event to a second user in response to determining that the update event matches the record identifier.

14. The computer program product of claim 13, wherein the update event is a notification of changes to the content for the first webpage form, wherein the changes are selected from a group consisting of an addition of a new data record by a second user, opening of a second webpage form by the second user for editing the data record that is displayed to the first user, updating of the data record by the second user, and combinations thereof.

15. The computer program product of claim 13, further comprising:
  code for prompting the first user for a response in regard to the update event, wherein a prompt comprises a prompt to update the data record displayed in the first webpage form, a prompt to discard the changes made by the second user, or a prompt to merge the data record with the changes made by the second user.

16. The computer program product of claim 13, further comprising:
  code for updating the data record displayed in the webpage form based on information in the update event without refreshing, reloading, or otherwise re-retrieving relevant content for the webpage form.

17. The computer program product of claim 13, wherein the connection is a web socket connection.

18. The computer program product of claim 13, wherein the update event is a compressed JSON syntax of the data record consisting of the record identifier, a data source, and changed values of the data record, but not unmodified data of the data record.

* * * * *